United States Patent
Stupek, Jr. et al.

(10) Patent No.: US 6,526,442 B1
(45) Date of Patent: Feb. 25, 2003

(54) PROGRAMMABLE OPERATIONAL SYSTEM FOR MANAGING DEVICES PARTICIPATING IN A NETWORK

(75) Inventors: Richard A. Stupek, Jr., Harris County, TX (US); William D. Justice, Jr., Harris County, TX (US); James A. Rozzi, Harris County, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/111,043

(22) Filed: Jul. 7, 1998

(51) Int. Cl.$^7$ ............................................. G06F 15/173
(52) U.S. Cl. ...................................... 709/224; 709/226
(58) Field of Search ................................ 709/224, 225, 709/226, 300, 233; 714/4, 47; 345/329; 370/250, 401, 352, 384

(56) References Cited

U.S. PATENT DOCUMENTS

| | | | |
|---|---|---|---|
| 4,975,829 A | | 12/1990 | Clarey et al. ................ 364/200 |
| 5,027,269 A | * | 6/1991 | Grant et al. ................. 709/300 |
| 5,430,845 A | | 7/1995 | Rimmer et al. .............. 395/275 |
| 5,475,836 A | | 12/1995 | Harris et al. ................. 395/600 |
| 5,483,631 A | * | 1/1996 | Nagai .......................... 345/329 |
| 5,522,042 A | | 5/1996 | Fee et al. ............... 395/200.01 |
| 5,559,955 A | * | 9/1996 | Dev .............................. 714/4 |
| 5,559,958 A | | 9/1996 | Farrand et al. ......... 395/183.03 |
| 5,561,769 A | | 10/1996 | Kumar et al. .......... 395/200.05 |
| 5,572,195 A | | 11/1996 | Heller et al. ............ 340/825.35 |
| 5,581,478 A | | 12/1996 | Cruse et al. ................. 364/505 |
| 5,606,664 A | * | 2/1997 | Brown ........................ 709/224 |
| 5,608,907 A | | 3/1997 | Fehskens et al. ............ 395/672 |
| 5,619,656 A | * | 4/1997 | Graf ............................ 709/224 |
| 5,621,663 A | * | 4/1997 | Skagerling ................... 714/47 |
| 5,627,819 A | * | 5/1997 | Dev et al. .................... 370/250 |
| 5,751,965 A | * | 5/1998 | Mayo .......................... 709/224 |
| 5,796,633 A | * | 8/1998 | Burgess et al. ............. 709/224 |
| 5,881,315 A | * | 3/1999 | Cohen ......................... 709/234 |
| 5,944,782 A | * | 8/1999 | Noble et al. ................. 709/224 |
| 6,012,095 A | * | 1/2000 | Thompson et al. ......... 709/233 |
| 6,144,667 A | * | 11/2000 | Doshi .......................... 370/401 |
| 6,336,139 B1 | * | 1/2002 | Feridun et al. ............. 709/224 |

OTHER PUBLICATIONS

Muralidharan, Baktha; IEEE Journal on Selected Areas in Communications; vol. 11, No. 9; Dec. 1993; pp. 1336–1345.

\* cited by examiner

*Primary Examiner*—Patrice Winder
(74) *Attorney, Agent, or Firm*—Akin, Gump, Strauss, Hauer & Feld, LLP

(57) ABSTRACT

A programmable operational system for managing devices participating in a network including a collection of notices, operation logic that filters the collection of notices based on at least one criteria and that generates at least one operation indicative of a state change of the network, and an automation engine that uses the at least one operation to perform at least one process in response one or more operations. The collection of notices, generated by a plurality of routines, are indicative of the state of hardware, software, and user actions that comprise the network including the state or status of one or more of the devices participating in the network. The operation logic may include an operation engine and one or more operational groups. Each operational group may further include one or more operations, each including a filter and configuration information. The operation logic may further generate at least one job and store the job into memory, where each job references an operation. The operation logic invokes a helper process to facilitate execution of each operation by the automation engine. Thus, the process executed in response to the one or more operations may be implemented to provide an appropriate response to changes in the network.

21 Claims, 25 Drawing Sheets

PROGRAMMABLE OPERATIONAL SYSTEM FOR MANAGING DEVICES PARTICIPATING IN A NETWORK

FIELD OF THE INVENTION

The present invention relates to network management, and more particularly to a programmable operational system for managing devices participating in a network.

DESCRIPTION OF THE RELATED ART

In computer network environments, it is advantageous to manage the various software and hardware components coupled to the network from a central location or from a remote location, such as the system manager's office. Such central or remote management of a network is commonly accomplished using industry standard protocols, such as the Simple Network Management Protocol (SNMP) or the Desktop Management Interface (DMI). SNMP provides a reliable and well-known mechanism for remotely controlling network devices. However, SNMP requires the use of specialized management consoles. These consoles are typically expensive and are generally restricted to only those situations where the cost and training can be justified. DMI is a proprietary system that is deficient for similar reasons.

There is an industry-wide trend for considering network management across a network using Internet technology such as the World Wide Web (WWW), which is an Internet technology that is layered on top of the basic Transmission Control Protocol/Internet Protocol (TCP/IP) services. Other Internet technology concepts include the HyperText Transfer Protocol (HTTP), the Universal Resource Locator (URL), and the HyperText Markup Language (HTML). Such technologies are widespread and use of the various Internet protocols is growing. However, such technologies were not designed for purposes of network management and suffer from many deficiencies. For example, although HTML is the most commonly used language for writing web pages displayed by a browser, HTML is relatively static and is generally considered to lack the flexibility and programmability required for network management. Further, when SNMP and DMI communication protocols are used in existing systems, the user is limited to a fixed system. The systems cannot be flexibly programmed and are not designed for communication of management commands across an intranet or the Internet.

It is desirable to provide remote network management across an intranet or the Internet using a web browser while keeping at least the functionality and flexibility of SNMP or DMI. It is also desired to provide flexibility in the display of management data.

SUMMARY OF THE INVENTION

A programmable operational system for managing devices participating in a network according to the present invention includes a collection of notices, operation logic that filters the collection of notices based on at least one criteria and that generates at least one operation indicative of a state change of the network, and an automation engine that uses the at least one operation to perform at least one process in response one or more operations. The collection of notices are indicative of the state or status of hardware, software, user actions that comprise the network, etc., where the network status may include the state or status of one or more of the devices participating in the network. The notices may be generated by a plurality of routines, where each routine periodically generates one or more notices and stores the notice(s) into the collection of notices. In this manner, the collection of notices generally includes the state information including state changes that occur in the network.

The operation logic may include an operation engine and one or more operational groups, where each operational group is implemented for being processed by the operation engine. Each operational group may further include a filter and configuration information associated with the at least one operation. For example, an operational group may include at least one first operation associated with new notices in the collection of notices, at least one second operation associated with current notices in the collection of notices, and at least one third operation associated with notices removed from the collection of notices.

The operation logic may further generate at least one job and store the job into memory, where each job references an operation. The operation logic invokes a helper process to facilitate execution of each operation. In particular, the helper process generates an event notification and provides the event notification to the automation engine, where the event notification includes at least one reference to an associated job to enable the automation engine to access the operation(s) via the jobs. The automation engine may further include event detection logic and one or more predetermined constructions, where each construction registers with the event detection logic to listen to at least one event notification. When a construction is invoked, it uses one or more operations to perform one or more associated processes. The event logic, upon detecting an event notification, invokes each construction that has registered to listen to the detected event notification. Each job may include at least one reference to the one or more notices associated with the operation to enable the automation engine to access those notices.

A network system according the present invention includes at least one managed device participating in a network and a management server implemented with a programmable operational system as described above. A second management server may be included that also includes a programmable operational system. The first management server may further include a helper locator, where the operation logic of the first management server invokes the helper locator to locate the helper process of the second management server to facilitate execution of each operation. Upon location of a helper process of the second management server, the helper process generates an event notification and provides the event notification to its automation engine. The event notification includes at least one reference to the job(s) located on the first management server to enable the automation engine of the second management server to locate and access each associated operation located on the first management server via the network.

A method of managing a network according to the present invention includes periodically generating a plurality of notices indicative of the state of the network, storing the plurality of notices into a collection of notices, executing an operation filter on the collection of notices based on at least one criteria to create at least one operation indicative of at least one state change of the network, sending an event notification referencing the one or more operations to an automation engine, and the automation engine performing a process based on at least one operation. The method may further include generating and storing at least one job referencing each operation, providing a reference to the job in the event notification, and the automation engine locating the job using the reference in the event notification.

The method may further include locating a remote helper process on the network and providing the located helper process a reference to the at least one operation. The remote helper process sends the event notification to its local automation engine, and the local automation engine locates and performs a process based on at least one operation. The method may further include creating a plurality of operations indicative of state changes of the network, where the operations include a first operation indicative of new notices in the collection of notices and a second operation indicative of notices removed from the collection of notices. A third operation indicative of current notices may also be included.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
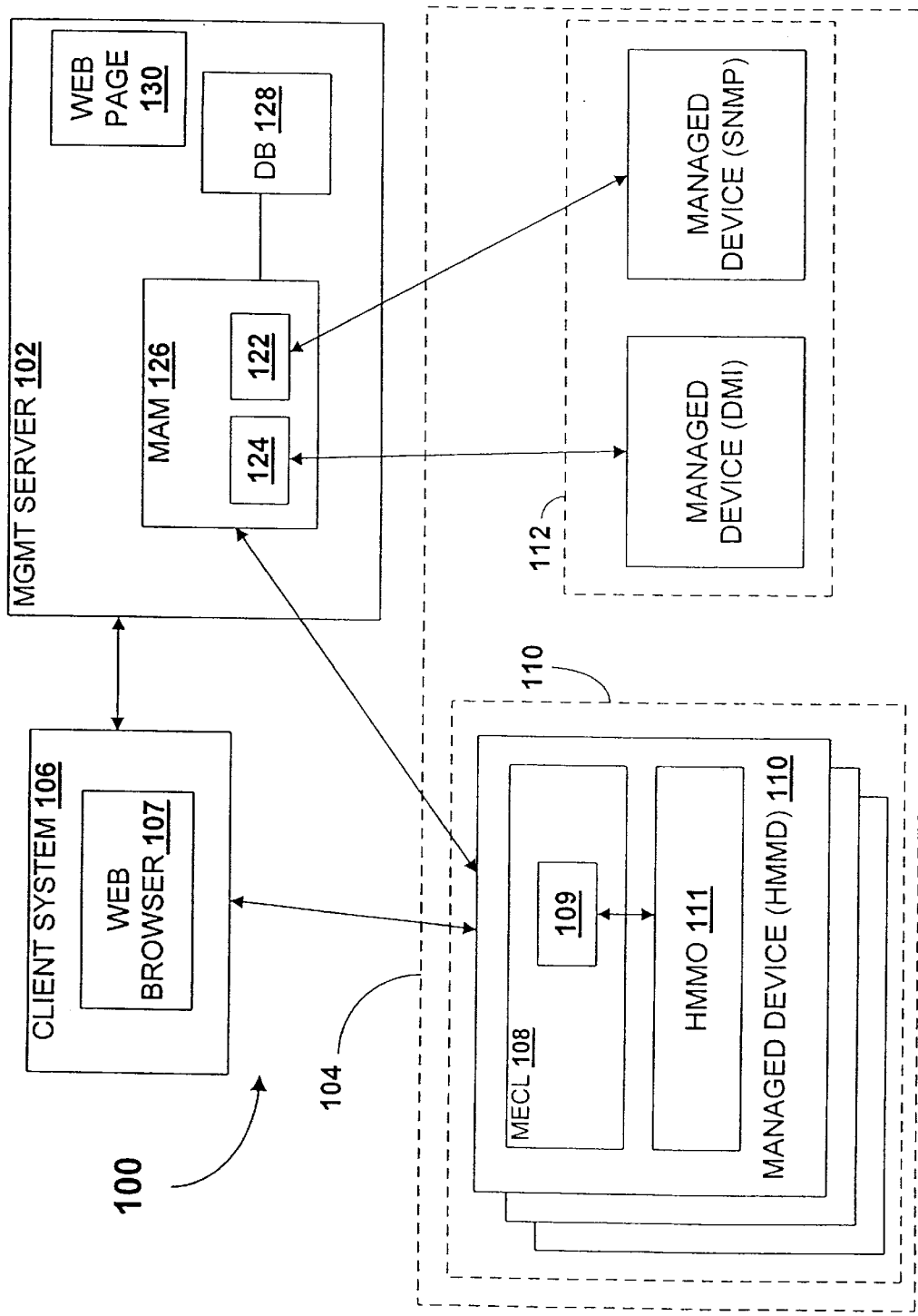
FIG. 1 is a block diagram of a web-based management network according to the present invention.

Referring now to FIG. 1, a block diagram of a web-based management network 100 is shown. A management system according to the present invention, such as the management network 100, enables management of both hardware and software components over a network using Internet technology. The management network 100 includes a management server 102, one or more managed elements (including devices, systems, etc.) 104, and a client system 106 that are coupled together using any one or more network architectures or technologies, such as Ethernet®, Asynchronous Transfer Mode (ATM), Token Ring, etc. The management network 100 preferably supports the World Wide Web (WWW), which is an Internet technology that is layered on top of the basic Transmission Control Protocol/Internet Protocol (TCP/IP) services. The management network 100 may be any type of network or network topology such as a separate intranet, part of the Internet itself, an intranet with access via a gateway or firewall to the Internet, etc.

The managed elements 104 generally include computer systems, such as desktops, portables, personal computer systems (PCs), servers, workstations, etc. as well as other networking devices, such as switches, repeaters, hubs, network interface cards (NICs), etc. The managed elements 104 are generally divided into two different types, including web-enabled devices or Hyper-Media Managed Devices (HMMDs) 110 and legacy devices 112. The legacy devices 112 include those devices implemented with the Simple Network Management Protocol (SNMP), the Desktop Management Interface (DMI), or similar type management systems known to those skilled in the art.

The HMMDs 110 each include one or more management agents called Hyper-Media Managed Objects (HMMO) 111. In the preferred embodiment, the HMMDs 110 each convert management data into a form that may be browsed using Internet technology, which may incorporate TCP/IP, Universal Resource Locator (URL), HyperText Transfer Protocol (HTTP), HyperText Markup Language (HTML), Java™, JavaScript, etc. A managed element communication layer (MECL) 108 including one or more servers 109 is provided at the front end of the HMMOs 111 for providing security of and access to management data of the corresponding HMMD 110. The servers 109 preferably operate as HTTP servers, and a separate server 109 is loaded and operated within the MECL 108 for each installed HMMO 111.

The client system 106 supports TCP/IP and includes a web browser 107 for accessing and displaying management information from the management server 102 or any of the HMMDs 110. Examples of web browsers include MicroSoft (E) Internet Explorer for Windows 95® or Windows NT® and Netscape Navigator™ for Windows 95®, Windows NT® or HP/UX by Hewlett Packard. Other web browsers are contemplated as well. It is desired that the web browser 107 support a scripting language, such as JavaScript or the like. Scripting language includes instructions interpreted by the web browser 107 to perform certain functions, such as how to display data. The client system 106 generally replaces the management console of an SNMP management system, providing access to either the HMMDs 110 or the management server 102.

The management server 102 preferably uses an appropriate operating system (OS) such as Windows NT® or the like.

The management server 102 also executes or otherwise operates as a Hyper-Media Management Application (HMMA) that provides management services for all of the managed elements 104 including the HMMDs 110 and the legacy devices 112. The management server 102 is the aggregation point for all management information of the management network 100 and provides a unified data model, in which data from the legacy devices 112 (SNMP, DMI, etc.) and data from the HMMDs 110 are consolidated into a common form. As such, the system and network management is unified and allows for easier integration and navigation between applications.

The management server 102 accesses management data from the HMMDs 110 and controls those devices using Internet technology. The HMMOs 111 operate as self-describing web agents that use common web-enabling components to provide registration, discovery, security and HTTP communications. The HMMO web agents render information in HTML, or in scripting language, or a combination of both, for viewing by the web browser 107 on the client system 106. The information may also be sent directly to the management server 102. The management server 102 also converts data from the legacy devices 112 into a form that may be browsed. For example, the management server 102 includes an SNMP converter 122 that converts SNMP-based data from SNMP managed devices to HTML, and a DMI converter 124 that converts DMI-based data from DMI managed devices to HTML. The management data from the managed elements 104 is stored in a management database 128 maintained on the management server 102. The SNMP converter 122 and the DMI converter 124 are examples of management applications 126, which are plug-in modules used to perform the functions or otherwise expand the capabilities of the management server 102. In this manner, the management server 102 is adaptable and flexible depending upon specific embodiment needs. The management server 102 also generates a home page 130 accessible by any appropriate web browser, such as the web browser 107 executing on the client system 106 or a browser on the management server 102 itself.

The management server 102 provides a management foundation, which includes discovery of manageable devices, performance of event management and determination of device status and device groups. The database 128 preferably includes events, discovered devices, device status, user preferences and user-specified data that is actively monitored. The management server 102 performs management services to discover managed elements 104 of the management network 100 and to track the device state of all of the managed elements 104. The management server 102 discovers devices on the network using IP pinging for IP devices, SAP broadcasts for Internetwork Packet Exchange (IPX) devices and is extendible to enable other discovery mechanisms. The management server 102 periodically collects and saves configuration information in the database 128 in a common form regardless of whether the information was originally web-based, SNMP or DMI. For example, the management server 102 stores events and traps, and enables configuration of filters that ultimately generate queries that are used to select records from the database 128. The management server 102 also enables access of the database 128. The database 128 is preferably based on SQL Server by Microsoft® and is accessed via Java™ DataBase Connectivity (JDBC) or Open DataBase Connectivity (ODBC). SQL views are created to abstract the database 128 for reporting purposes.

The management server 102 enables the user to select a managed element 104 and view detailed information about that device. The management server 102 also enables a user to create device groups for business process views by filtering for selected devices and for selected events of those devices. The management server 102 handles events, such as SNMP traps and HTTP alerts, logs the events, and allows a user to set event filters.

The client system 106 includes a web browser 107 for accessing and displaying management information from the management server 102 and any of the HMMDs 110. For example, the client system 106 sends an HTTP request in URL format to an HMMD 110, which is received by the MECL 108 of that HMMD. The MECL 108 accesses an index page for the HMMD 110, or the request is transferred to one of the servers 109 for a corresponding one of the HMMOs 111. Each HMMO 111 formulates or renders a corresponding web page using HTML and/or scripting language, which is passed back to the client system 106 for rendering and display via the server 109 of the MECL 108. The client system 106 accesses the home page 130 or data from the database 128 in a similar manner using TCP/IP and another URL. The management server 102 also performs security functions.

It is noted that the legacy devices 112 are managed and controlled by the management server 102 as usual according to the particular protocol supported (SNMP, DMI), so that the client system 106 might not necessarily have direct access. Nonetheless, the client system 106 has access and control of the legacy devices 112 via the management server 102. In this manner, it is appreciated that the client system 106 may be located anywhere on the Internet to access and control all of the managed elements 104 of the management network 100.

One of the primary goals of the management network 100 is to ensure a continuous operation of the network with as little down time as possible by isolating and solving problems. The management server 102 provides the base for software modules to expose and present the solutions to problems that exist within the management network 100. The act of finding problems, reducing the complexity in analyzing or diagnosing problems, and helping to resolve problems is referred to as Action Oriented Management (AOM). AOM comprises several concepts, including discovering and defining a problem, determining the course of action(s) to take based on the problem, and providing the resolution to the problem and whether the resolution may be performed, either programmatically or as a list of steps for the user to follow.

There are many categories of actions that the management server 102 discovers. One action category is hardware fault detection, which is a category of actions identifying problems with hardware. Examples of hardware fault detection include failures or predictive failures on hard drives, processors, and memory. Most problem resolutions in the is hardware fault detection category are simply identified steps that the user must follow to correct the problem. Tools in this category allow viewing of the problem. Another action is software configuration actions, which are actions that identify potential problems with software configurations. Software configuration actions use version control functionality along with the concept of a "software set". The user establishes a set of software that should be loaded on a server, and this category of actions identifies any deviations from that set, and differences between the set and the latest software. Problem resolution for software configuration allows distribution of software updates, along with retrieval of new software. Tools in this category include software distribution, Internet download, and report generation.

Another action category is thresholds, which are actions that track situations on the network identified by combinations of data. The user has to configure the situations. The threshold tools allow the user to monitor management data and be notified whenever certain conditions arise. Another action category is action advisories, which are actions that notify the user whenever an event is needed to be performed, such as service advisories generated by the manufacturer of the management server 102. Other advisory examples include backups, disk storage cleanup, etc. Tools for this category provide the details of the action advisory and may allow corrective action. Another action category is software updates, which are actions that notify the user whenever a new software update to software on their network becomes available on a corresponding web site. Tools for this category allow the new update to be fetched from servers setup on a user's network. Another action category is traps, which are actions that occur when an SNMP trap, an HTTP event, a DMI indication, or similar type of trap or event is received. The trap is turned into an action that is operated on just as any other action. The tools in this category allow the user to forward the trap to other management consoles, to page the user, provide correlation, etc.

In general, management is often classified by what is being managed: hardware, operating system, software, etc. The following Table 1 illustrates the layers and the management data that is typical of that layer. It is noted that Table 1 is by no means exhaustive and simply provides typical management data for the corresponding layer.

TABLE 1

Management Layers and Corresponding Typical Management Data

| Managed Layer | Examples of managed data at each layer |
| --- | --- |
| Applications (highest layer) (Vertical, specialized applications) | Transactions per second Application specific data, such as status of batch processing activities |
| Databases, web servers, So-called "Horizontal" applications | Table space used Number of locks set Resources used - percent of system work areas, etc. |
| Operating System | Number of processes Interrupts per second being serviced Percent of CPU time spent in user state Names of processes |
| Hardware (lowest layer) | Configuration: serial number of disk drive, bytes of RAM installed, etc. Operational: number of bytes sent by Ethernet controller, number of packet collisions on Ethernet, temperature of CPU cabinet, etc. |

Figure 2:
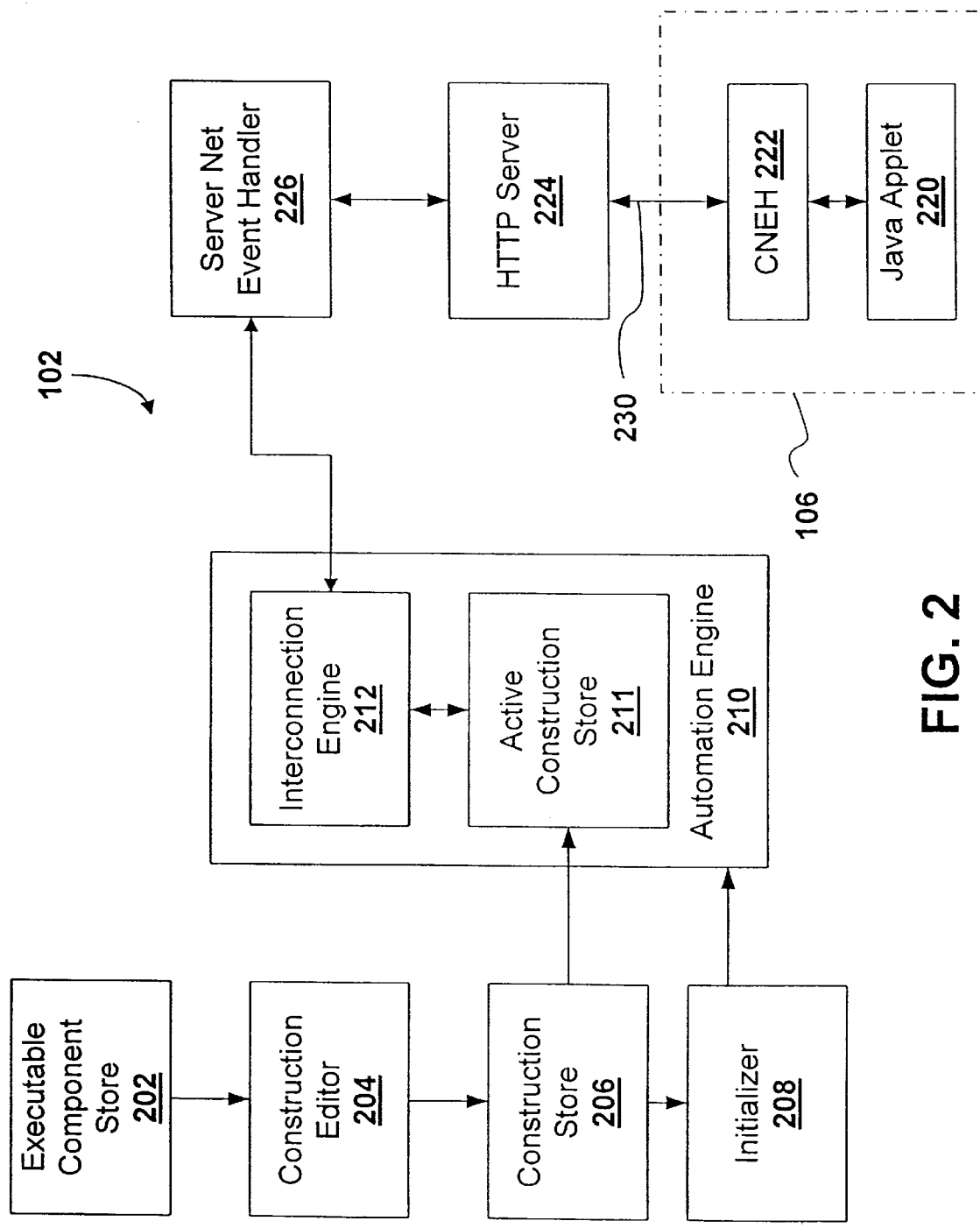
FIG. 2 is a block diagram of the management server of FIG. 1 including a programmable event driven processing system according to the present invention.

Referring now to FIG. 2, a more detailed block diagram is shown of exemplary portions of the management server 102 for performing programmable event driven management processing and as it operates in conjunction with the client system 106. The management server 102 includes an executable component store 202, a construction editor 204, a construction store 206 for permanently storing constructions, an initializer 208, and an automation engine (AE) 210. The AE 210 includes an active construction store 211 and 10 an interconnect engine 212. The active construction store 211 is a memory such as a random access memory (RAM) or the like. An executable component is a software module that performs a basic function or arbitrary processing and that allows its input and output parameters to be discovered by another program without compiling or otherwise processing the module (i.e., "self describing"). One or more predetermined executable components are is stored in the executable component library or store 202 and are accessible by a software program, such as the construction editor 204, to form collections of one or more executable components called "constructions." Once an executable component is defined and compiled, instances of the executable components are copied and used in the constructions. This provides an advantage in that executable components do not have to be recompiled to create new constructions. The construction editor 204 accesses the executable component store 202 and accepts input commands that specify and define a relationship between the executable components that constitute the construction being assembled. These commands can be supplied by a human operator, a batch command file, or any other suitable method.

Each construction is executed to perform one or more basic functions to perform a management operation. Constructions are designed to take specific actions in response to management events or "events" that occur on the network. For example, upon power up or initialization, the initializer 208 performs operations required for the execution of the AE 210 and to enable the management server 102 to begin operation. The initializer 208 loads a copy of the constructions stored in the construction store 206 into the active construction store 211 and creates an initialization event called "init event." At least one construction loaded into the active construction store 211 is registered to listen for "init event" and respondingly initializes and starts an HTTP server 224, a server net event handler (SNEH) 226, and other processes to initialize the system. Finally, the interconnect engine 212 handles the flow of all events of the management server 102 during operation.

An event is responsible for providing information about something related to the network that should be done or something network related that has happened. It is similar in concept to a windows message in Win32. The interconnect engine 212 is responsible for dispatching events that are generated to the constructions. A construction, which includes a listener of events, is made up of many executable components coupled or otherwise interfaced together to perform one management function or a portion of a management function upon receipt of an event from the interconnect engine 212.

In the embodiment shown, the client system 106 communicates with the management server 102 through a Java applet 220 and a client net event handler (CNEH) 222. The management server 102 includes the HTTP server 224 and the SNEH 226 that are communicatively coupled to the CNEH 222 of the client system 106 via a network link 230. The network link 230 may comprise or be based upon any type of network architecture or technology, such as Ethernet®, Asynchronous Transfer Mode (ATM), Token Ring, etc., and may incorporate any type of network topology such as an intranet, part of the Internet, etc. The SNEH 226 is the point at which any device, including the client system 106, communicates with the interconnect engine 212 of the management server 102 and is the access point through which the flow of all events is channeled.

Figure 3:
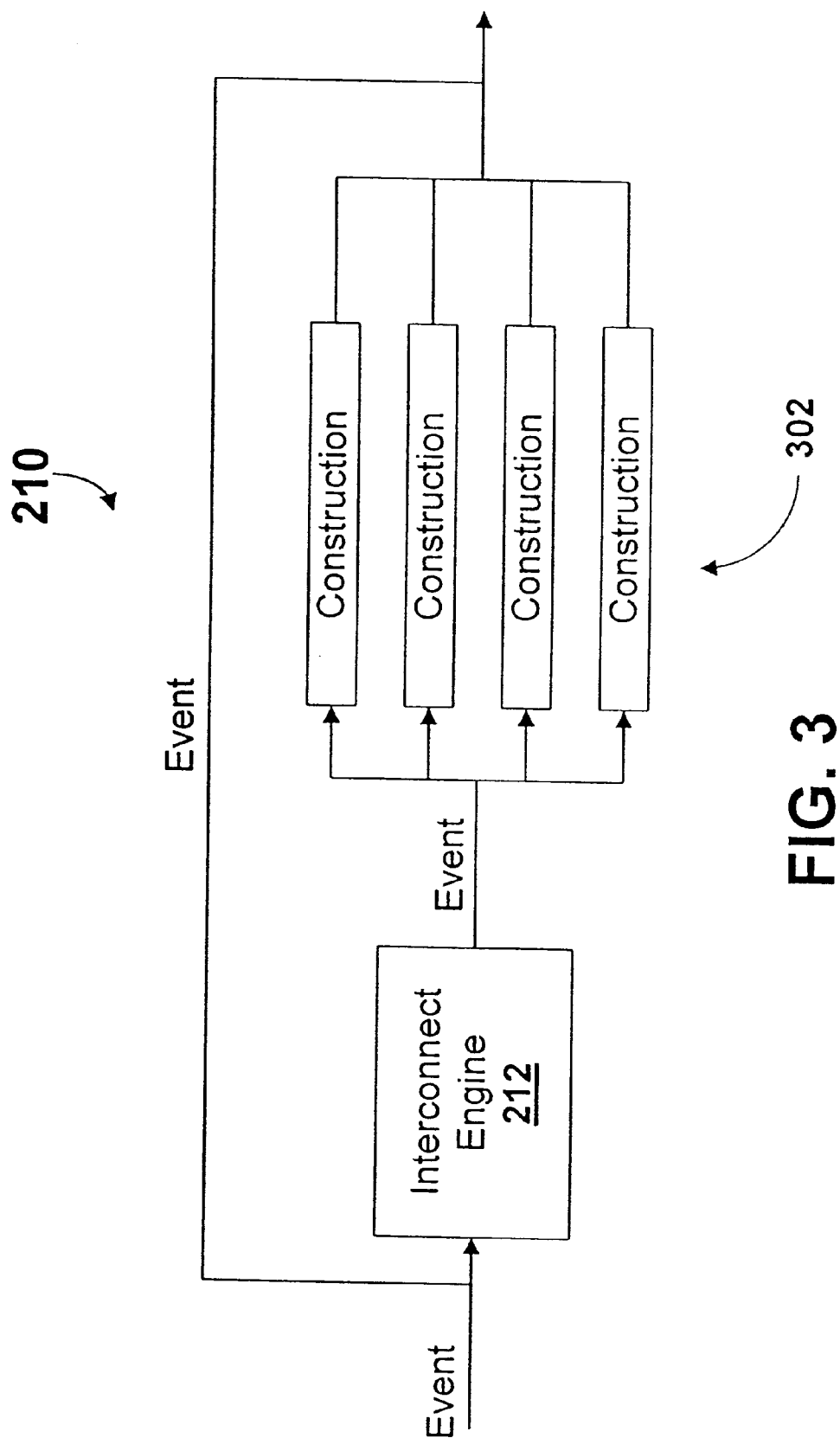
FIG. 3 is a block diagram of an exemplary automation including an engine for connecting events with a plurality of constructions in accordance with the present invention.

FIG. 3 is a block diagram of the AE 210 including the interconnect engine 212 that is responsible for connecting together events with constructions or "listeners" 302 of the events. In the embodiment of FIG. 3, the interconnect engine 212 receives an event signal or notification, either externally or from a construction 302, and relays the event to the appropriate one of the constructions 302. The interconnect engine 212 determines which construction 302 to relay the particular event to based on registration information that has been recorded in the interconnect engine 212. The interconnect engine 212 includes event detection logic for registering to receive events using interconnection logic and also passes those events to the proper constructions based on the registration information. Further, the event detection logic includes a server interface for interfacing with the network and a server event handler, coupled to the server interface and the interconnection logic, that routes event notifications received by the server interface to the interconnection logic. Thus, an event cycle is supported in which the interconnect engine 212 receives an event (either externally or internally) and then determines which destination construction(s) to send the event. Next, the construction(s) may generate an internal event and the internal event is passed back to the interconnect engine 212 to begin a new cycle. This cycle is repeated as necessary for the particular management operations of the system. The SNEH 226 registers as an event forwarder and receives events for which no listener has registered. Such unregistered events include net events received and transmitted via the HTTP server 224.

Figure 4:
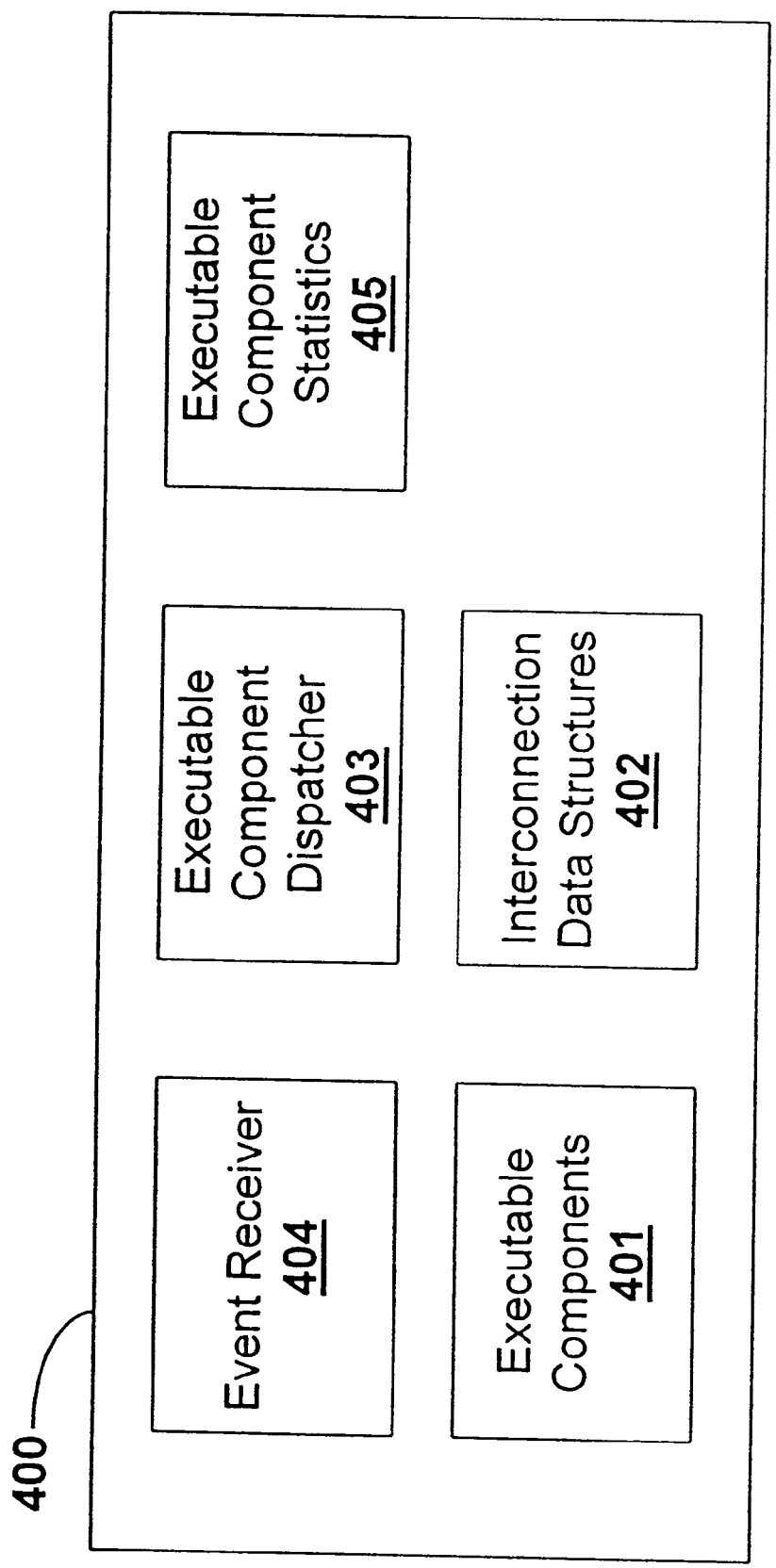
FIG. 4 is an exemplary block diagram of a construction according to the present invention.

FIG. 4 is a simplified block diagram of an exemplary construction 400 according to the present invention. The construction 400 of FIG. 4 includes, but is not limited to, one or more executable components 401, interconnection data structures 402, an executable component dispatcher 403, an event receiver (or event listener proxy) 404, and executable component statistics 405. The executable components 401 enable the construction 400 to be activated by notifying the event receiver 404 of the event parameters to monitor. One or more of the executable components 401 includes an event listener component to register with the event receiver 404 and becomes a listener for one or more specific events. The event receiver 404 serves as an event proxy for the executable components 401 by registering with the interconnect engine 212 to become a listener of the one or more specific events.

The interconnection data structures (or interconnection data) 402 describe the relationships between the executable components 401 as generated by the construction editor 204. This information is used by an executable component dispatcher 403 to control how the executable components are dispatched. The component dispatcher 403 controls operation of the construction 400 by invoking each executable component 401 and by copying parameters from one executable component to the next. The component dispatcher 403 also executes the construction 400 in a sequential manner so that if more than one event for which the construction 400 is registered occurs the component dispatcher 403 queues up the events and executes them in the order received. The executable component statistics 405 tracks and stores any or all statistics of the construction 400 that a user desires to monitor. The user may specify the desired statistics to monitor when generating the construction 400 using the construction editor 204.

Examples of statistics are as follows: When the construction last ran, how many times it has run, longest execution time, total execution time, the number of events queued is for the construction, high water mark for queued events, whether the construction is running, any errors generated by the construction, etc. The event receiver 404 maintains the executable component statistics. Additionally, it monitors how often the construction runs. If the construction is idle for a period of time greater than a preset amount, the event receiver 404 has the ability to unload construction elements 402, 403, and 401 from memory and preserve their state. This conserves memory when a construction is not in active use, although the event receiver 404 remains active. When it receives an event, it reloads the construction elements 402, 403, and 401 and restores their state such that they can commence processing the event.

Figure 5:
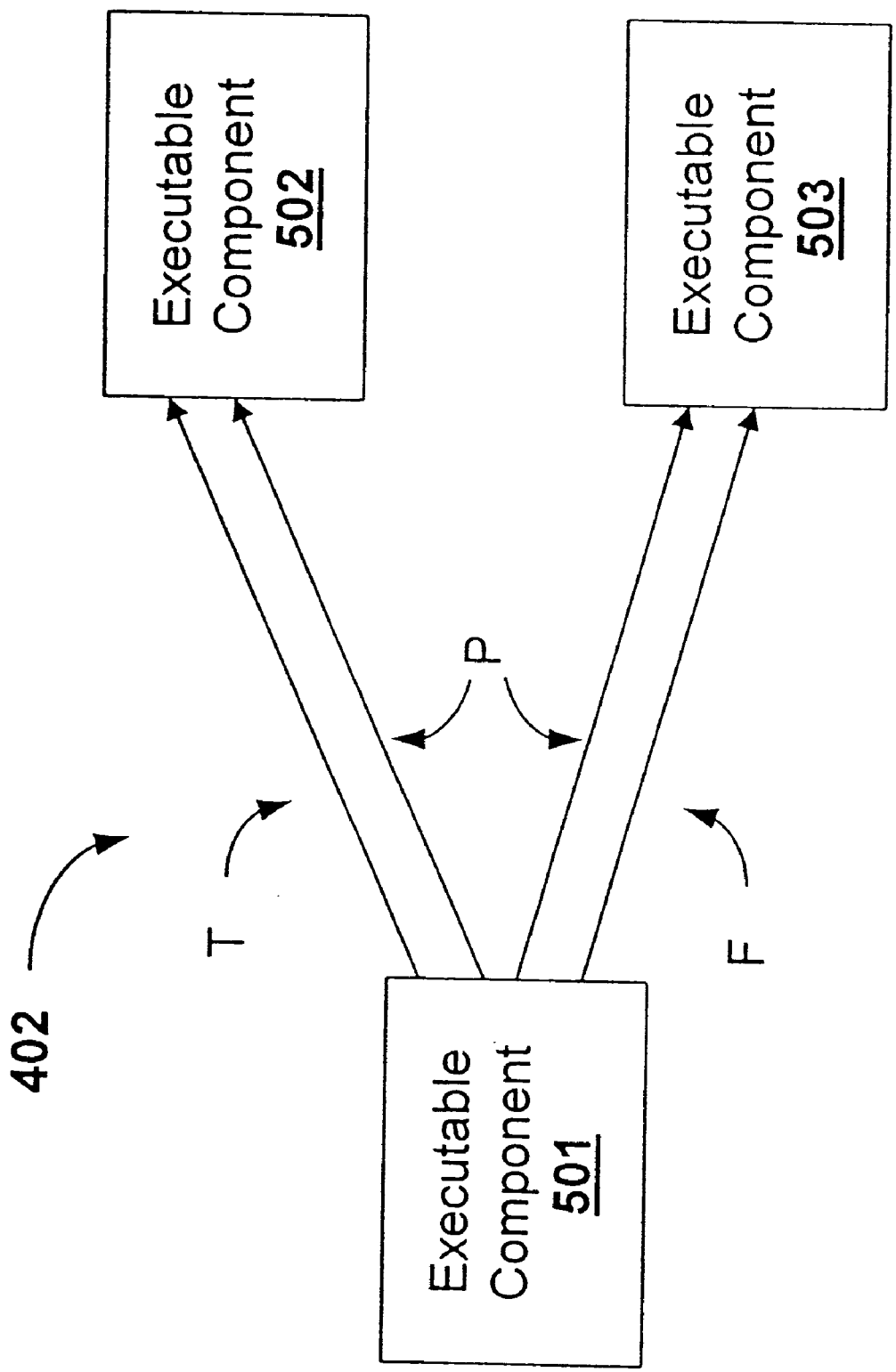
FIG. 5 is an exemplary block diagram of interconnection data structures defining relationships between components of a construction according to the present invention.

FIG. 5 is an exemplary block diagram of exemplary relationships between executable components 401 according to the present invention as would be stored in the interconnection data structures 402. These data structures specify the sequencing and relationships between the executable components 401. The executable component dispatcher 403 controls how the executable components 401 are dispatched. The embodiment shown in FIG. 5 illustrates the relationships between three executable components 501, 502 and 503. During operation, the executable component dispatcher 403 invokes a determineOutputState method 610 (FIG. 6) for generating an output value and at least one output parameter of an executable component, such as any of the executable components 501, 502, and 503. In the embodiment shown, the output value is Boolean. The executable component dispatcher 403 uses the output value and the interconnection data structures 402 to identify one or more subsequent components to be executed. In particular, the executable component dispatcher 403 copies output parameters from one executable component to the input parameters of a next executable component indicated by is the output result. For example, if the output value of the executable component 501 is true (T), the executable component dispatcher 403 copies the output parameters (P) of the executable component 501 to the input parameters of the executable component 502. The specific parameters to be copied are specified through the construction editor 204 and the relationships stored in the interconnection data structures 402. The relationships may be but are not necessarily one-to-one. For example, the second output parameter of executable component 501 may be copied to the first input parameter of executable component 502 or the executable component 502 inputs a subset of the output parameters supplied by the executable component 501. There is no restriction on the order of the copied parameters or on the number of parameters that are copied nor on the target executable component. The target executable component depends upon the output value. In the case of executable component 501, if the output value of the determineOutputState method 610 is false (F), the executable component 503 is invoked next. In this case, the executable component dispatcher 403 copies the output parameters (P) of the executable component 501 to the input parameters of the executable component 503 and invokes the executable component 503 instead of the executable component 502.

As a simple example, the steps used by the automation engine (AE) 210 are as follows: an event occurs; all listeners of or those that have registered to listen to the event are delivered the event in the form of an event notification or event message; a construction receives the event notification and activates itself; the AE 210 fetches the first executable component within the construction; any parameters external to the executable component are delivered to the executable component from the executable component that is sourcing the parameters; the determineOutputState method of the executable component is called to cause the executable component to perform its operation; and the output value is used to determine which executable component to move to next. This process is then repeated beginning with delivering parameters between consecutive executable components.

Figure 6:
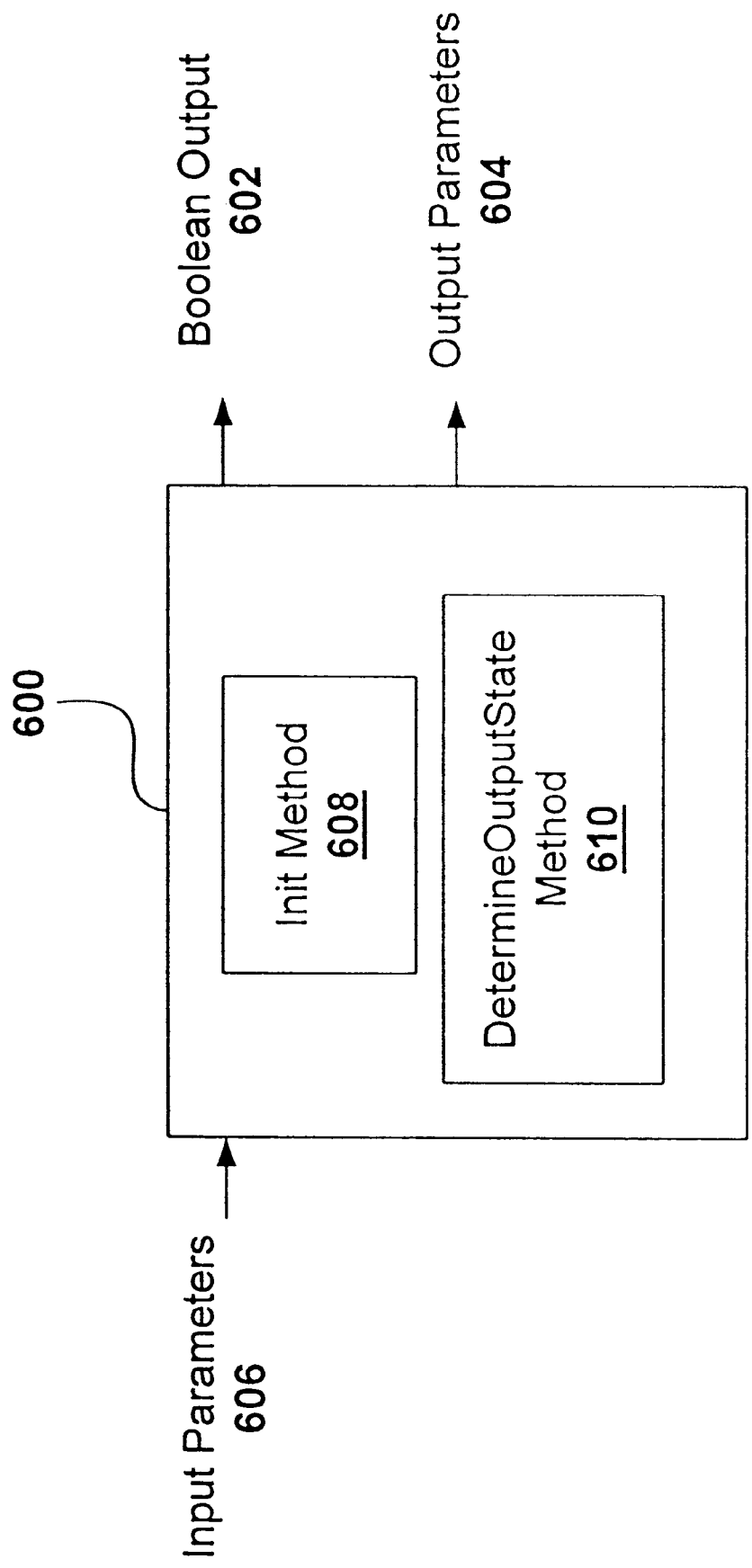
FIG. 6 is a block diagram illustrating an exemplary executable component according to the present invention.

FIG. 6 is a block diagram illustrating an exemplary executable component 600. The executable component 600 includes an init method module 608. When loaded, the init method module 608 initializes the state of the executable component 600, including setting initial values for any input and output parameters. The executable component 600 also includes a self describing software module called the DetermineOutputState method 610 that performs the primary processing of the executable component 600 and which may comprise any type of arbitrary processing to perform a desired basic function. The DetermineOutputState method 610 allows its input and output parameters to be discovered by another program without compiling or otherwise processing the module. The executable component 600 typically has a boolean output 602 which indicates the result of its processing and has zero or more output parameters 604 and zero or more input parameters 606.

Figure 7:
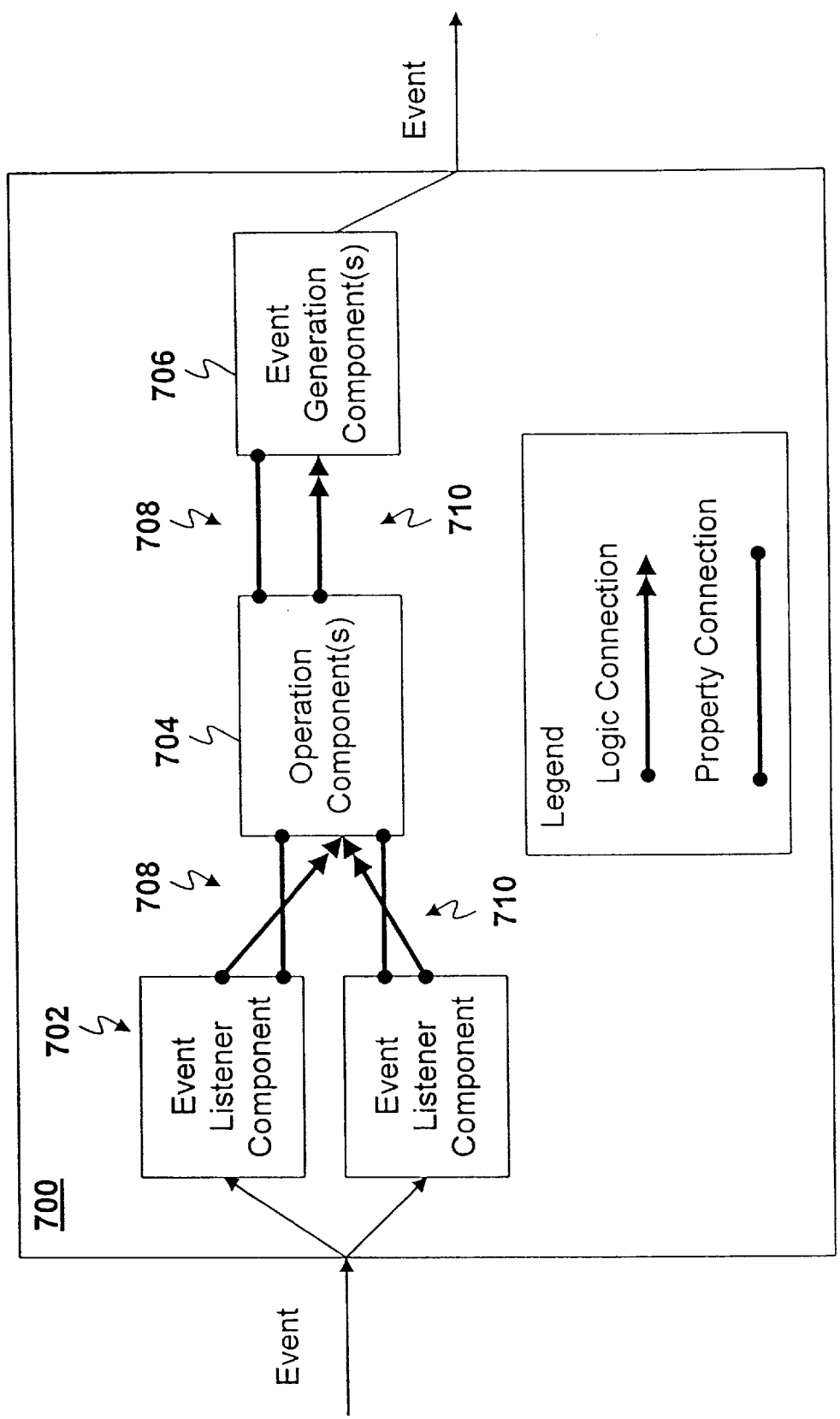
FIG. 7 is a block diagram illustrating operation of a construction editor for building a construction and programming the relationships between a construction and its operation component(s) according to the present invention.

FIG. 7 is a block diagram illustrating operation of the construction editor 204 for building one or more constructions. A construction 700 represents one management operation and includes all of the executable components and linkages between executable components that are necessary to perform the operation. The executable components 401 may include one or more event listener component(s) 702 that activate the construction, one or more operation component(s) 704 that make up the heart of the construction's functionality, and one or more optional event generation component(s) 706. The interconnection data structures 402 may include both property connections 708 and logic connections 710 that define the relationship between the executable components and that identify how to move between components based upon the output values. In order to build a construction, the construction editor 204 is commonly engaged. The construction editor 204 comprises an interactive tool that typically contains a tool palette with all of the available executable components from the executable component store 202 and allows selected executable components to be added to a construction. Although the executable components of FIG. 7 only include the event listener component(s) 702, the operation component(s) 704, and the event generation component(s) 706, additional types of executable components are contemplated.

Figure 7A:
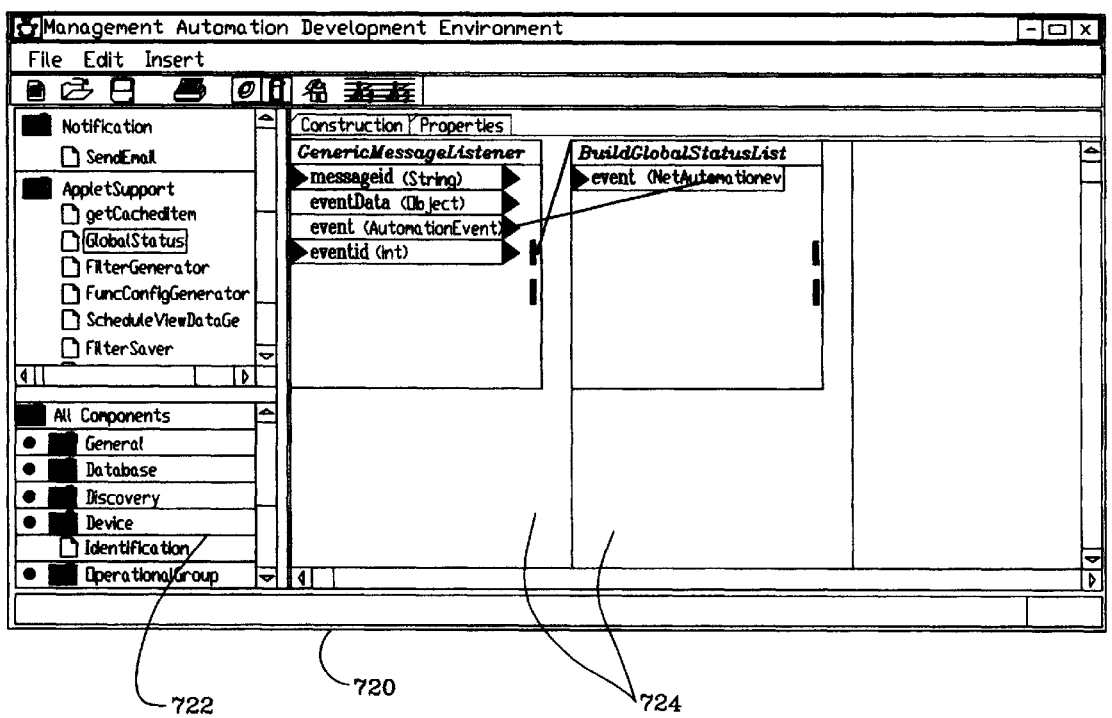
FIG. 7A is an exemplary computer screen shot of an exemplary construction editor according to the present invention.

FIG. 7A is an exemplary diagram of a screen shot 720 as it would appear on a computer display device when a user accesses the construction editor 204, which operates with a graphic user interface (GUI). The user manipulates one or more input devices, e.g., a mouse, a trackball, a keyboard, etc. (not shown), to select one or more executable components and to define the relationships using the property connections 708 and the logic connections 710. The screen shot 720 includes a list of components 722 from which the user selects using the available input devices. For example, the user selects one of the list of components 722 and places the selected component into a work area 724. The user then defines relationships between the selected components using property connections 708 and logic connections 710. Of course, the screen shot 720 shown in FIG. 7A is only exemplary and would be modified according to the web browser 107 and/or the operating system of the particular embodiment. Thus, the construction editor 204 provides the user with the ability to manipulate operations performed by or on the management server 102 from a remote or central location and across the Internet, an intranet, or other network topology.

Figure 8:
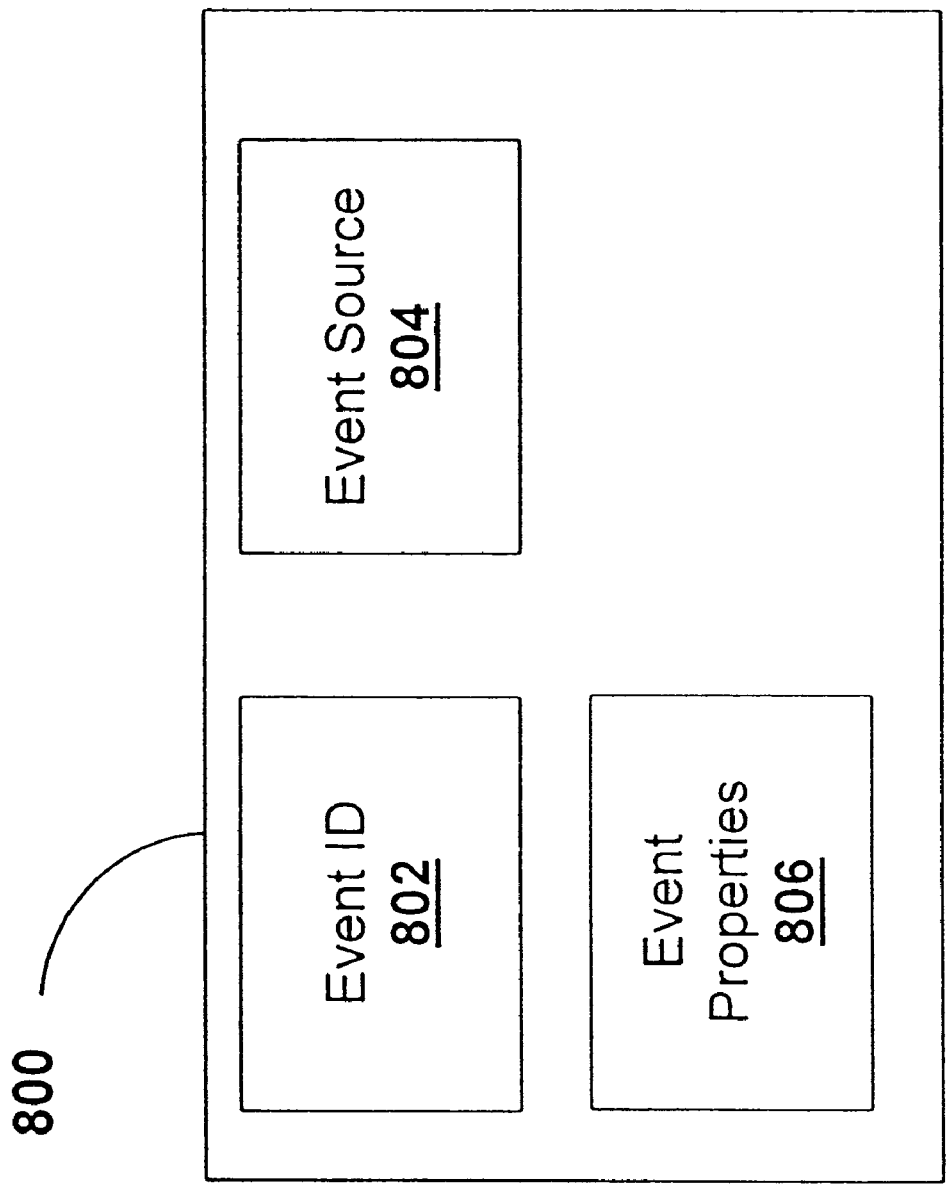
FIG. 8 is a block diagram of an event message module according to the present invention.

FIG. 8 is a block diagram of one embodiment of an event notification or message 800. The event message 800 is a data structure that represents the occurrence of a management event in the collection of managed devices 104 that are being managed by the management server 102. Events and corresponding event messages may also be generated by the client system 106, such as by using the web browser 107 or the like. Internal events may also be generated within the management server 102, such as by any of the constructions 302.

An event message 800 therefore indicates that a management automation event or "an event" has occurred and may cause an operation to be performed. Events as described herein are different than SNMP traps, although SNMP traps may cause management automation events to occur. The event message 800 contains an Event IDentifier (Event ID) 802 that uniquely identifies the type of event and an event creator or source 804 that specifies the entity that created the event message 800. The Event ID 802 of the event message 800 is used when "registering" to receive events. Optionally, the event message 800 may include properties 806 specific to the type of event. The properties 806 serve as information that the receiver of the event message 800 needs to perform its function. All events typically flow through the interconnect engine 212. The interconnect engine 212 is responsible for delivering event messages 800 to entities, such as constructions, that have registered to receive events. Examples of events that can be generated include but are not limited to: events sent to initiate execution of other constructions, timers, hardware faults, software configuration changes, software out of date, device status change, new device found, create device group, perform backup, etc. It is noted that the automation engine events are a mechanism for initiating execution of other constructions to accomplish some processing requirement. As such, the events in this context may not map one to one a specific external event such as a hardware fault.

Besides being identified by a particular Event ID 802, event message 800 can also be grouped together into categories. This allows listeners (or constructions) to listen in on a range of events without having to know all of the Event IDs within the category. The event category is not a property of the event but instead is established by registering with the interconnect engine 212 and establishing the categories that the event should be within.

Figure 9:
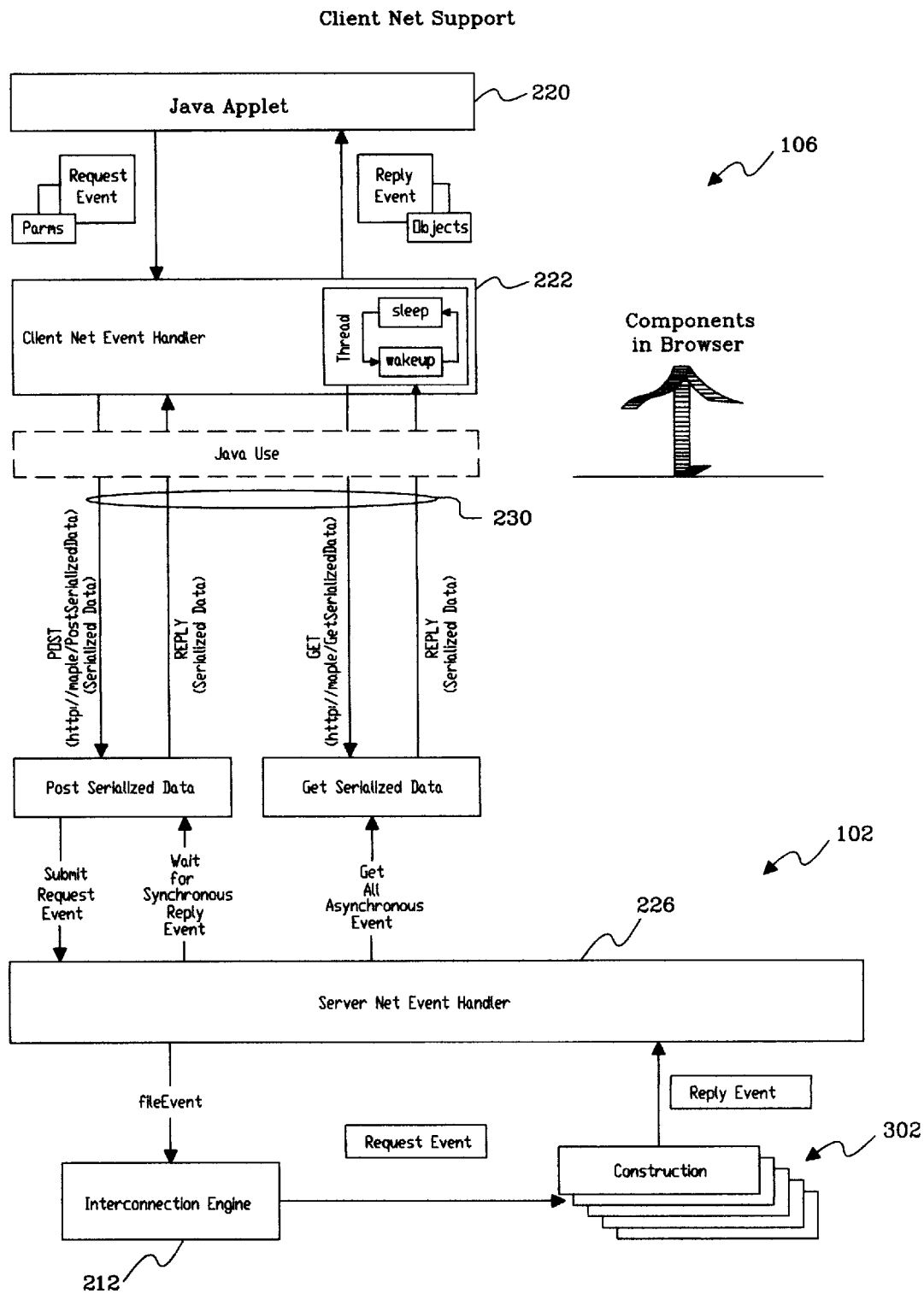
FIG. 9 is a block diagram of communication aspects of a client system and a management server for communicating an event request and an event reply according to the present invention using a Java applet.

FIG. 9 is a block diagram illustrating an event request and reply for a Java applet 220 running on the web server 107 of the client system 106 according to the present invention. The Java applet 220 requests an event message to be sent to the management server 102 for processing and then receives a response to the request. The communication used is preferably the normal client-server relationship of the client system 106 to the management server 102. For example, HTTP POST and HTTP GET operations may be used for the communication. If the applet 220 running on the client system 106 decides to send an event message to the management server 102, it creates an instance of a Java object NetAutomationEventRequest (See Appendix A) that contains parameters that describe an event request message. The parameters are commonly categorized as follows: the request type (synchronous or asynchronous); the reply data (object serialized form or HTML); an Event ID; a session identifier; and a maximum wait time for a synchronous request.

The NetAutomationEventRequest object instance is passed to the Client Net Event Handler (CNEH) 222 via a static Java application programming interface (API). The CNEH 222 submits the serialized event object to the management server 102 by means of an HTTP POST operation. The CNEH 222 passes the event object to the SNEH 226. The SNEH 226 adds a session identifier to the event request, which identifies the client system 106 that submitted the request. The session identifier is assigned by the management server 102 when the client system 106 successfully logs-in to the management server 102, and is maintained on the client system 106 as a parameter in a browser cookie. In this case, the session identifier is used to route a reply to the request back to the client system 106 from which it originated. If the Event Request is marked as synchronous, the SNEH 226 will not immediately produce a reply to the HTTP POST. Instead it blocks until the Request Event has produced a Reply Event.

The Request Event is routed by the SNEH 226 to the interconnect engine 212, which passes the Request Event to one or more constructions 302 that have registered as a listener of the Request Event. After one or more constructions are executed under control of the interconnect engine 212, a Reply Event is generated and provided to the SNEH 226. When the Reply Event is received by the SNEH 226, it returns the serialized Reply Event as the reply to the HTTP POST that submitted the corresponding Request Event. If the Request Event is marked as asynchronous, the SNEH 226 immediately responds and completes the HTTP POST transaction. This response contains no data since the event has not yet been processed.

The SNEH 226 registers as an event forwarder, so that it receives events for which no listener has registered for that specific event. Once the SNEH 226 receives an event from the AE 210, it checks to see if the event it has received is a Net Event. A Net Event is an event that is associated with a device, such as a managed device or the client system 106, that is external to the management server 102 and received via the network link 230. If the event is not a Net Event and no one is otherwise registered to listen to that event, then it is discarded. If it is a Net Event that is marked asynchronous, the SNEH 226 stores it with other Reply Events that are waiting to be returned to that same session identifier.

The return of a Reply Event to the applet 220 involves a thread that runs in the CNEH 222. This thread periodically issues an HTTP GET transaction to poll for one or more Reply Event(s). When the HTTP GET is received and processed by the management server 102, it calls SNEH 226 to determine if a Reply Event exists for session identifier. If there are no Reply Events for that session identifier, then the HTTP server 224 responds with no data. If a Reply Event is available, it is returned in the reply to the HTTP GET operation. When a reply to an HTTP GET is received from the management server 102 with that same session identifier, all of the Reply Events are preferably concatenated into a single HTTP entity body and returned to the CNEH 222. When the CNEH 222 receives the reply, it returns it to the applet 220. If the Reply Event is marked as synchronous, the SNEH 226 returns the Reply Event as a reply to the original HTTP POST operation.

It is noted that the Java Applet 220 in the client system 106 can initiate events for processing by a remote server and receive the results of the event processing with location transparency and that all communications may be implemented using standard HTTP/client system 106 to management server 102 protocol transactions. This permits use of this method through HTTP proxy servers and firewalls. Appendix A includes examples of three Java objects that are used in relation to Java applet 220. The objects are referred to, respectively, as NetAutomationEvent, NetAutomationEventRequest, and NetAutomationEventReply, and correspond to a management event, a request event, and a reply event, respectively.

In accordance with the present invention, the disadvantages of the prior art have been overcome through the implementation of a programmable event driven management processing system that invokes an automation engine in association with an interconnect engine and an active construction store. A construction editor is provided for building constructions across a network from remote or central locations. The construction editor allows a user to build the constructions using basic component functional building blocks including standard and/or customized parameters of interest to the user and to make those constructions available to the automation engine. Each construction performs a desired management operation in response to a management automation event. In this manner, network management is accomplished in a flexible manner that allows programmability of network management from a web browser or the like. Management events are created and monitored through the system according to the present invention.

Figure 10:
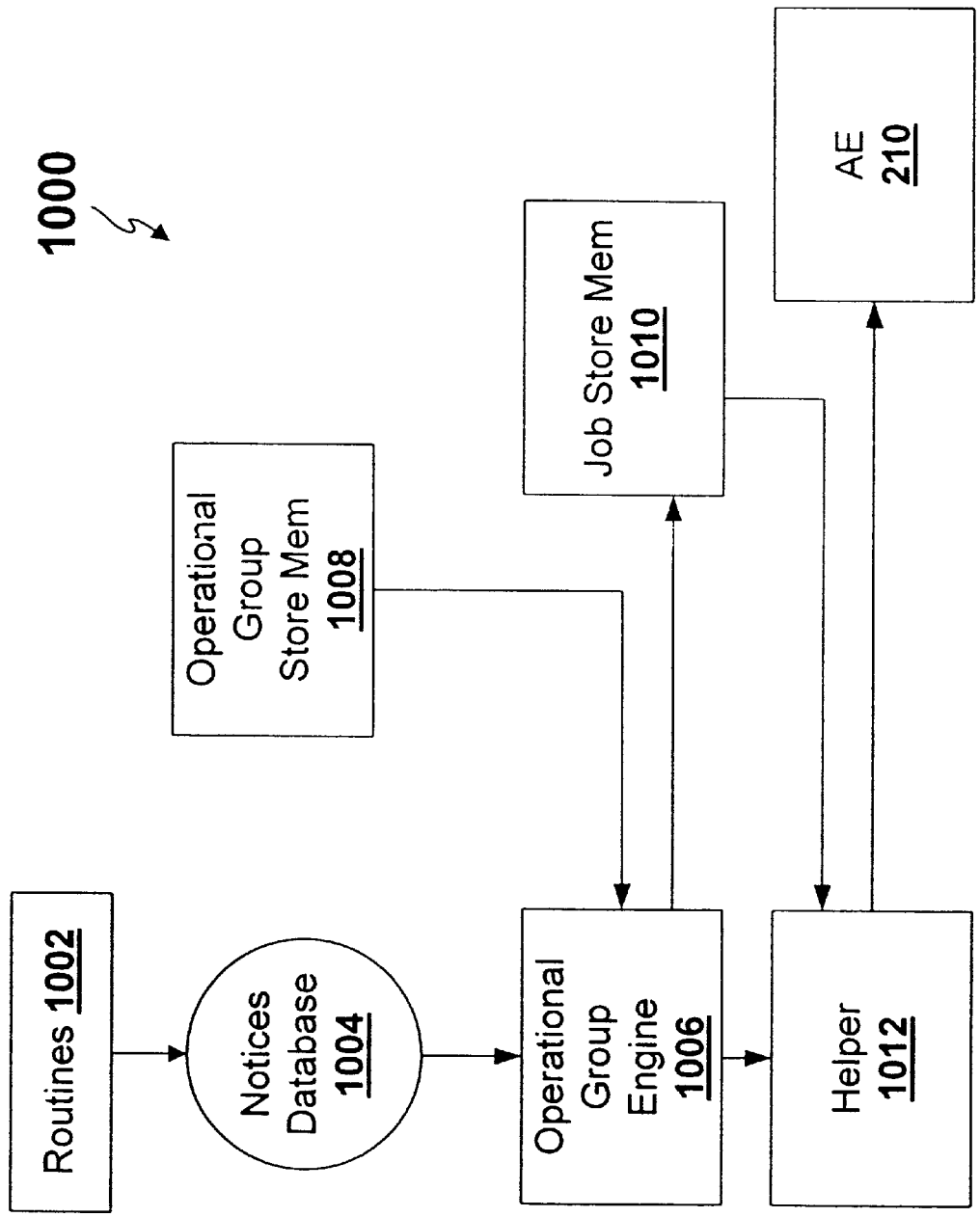
FIG. 10 is a block diagram of an operational group system performed on the management server of FIG. 1 in accordance with the present invention.

Referring now to FIG. 10, a block diagram is shown of an operational group system 1000 performed on the management server 102 in accordance with the present invention. One or more routines 1002 are executed continuously or periodically to generate notices that are programmatically added to a collection of notices or a notice database 1004. An example of a routine is an SNMP trap processor that has received one or more SNMP traps and generates a corresponding notice that describes the SNMP trap that was received. The SNMP trap processor generates a notice upon reception of the SNMP trap, and inserts the notice into the notice database 1004. It is noted that in the embodiment shown, approximately 100 or more SNMP trap types are handled by the SNMP trap processor routing. The notice database 1004 may be implemented as a table in a relational database, such as Microsoft SQL Server or the like. The use of any type of suitable database is contemplated.

Another example of a routine is a Discovered device routine, which generates a notice that indicates that a new device has been discovered in the network, such as the management network 100. Yet another example of a routine that adds notices to the notice database 1004 is a software update information routine that inserts notices that communicate the availability of new versions of software or other software changes to users. The notices inserted by this routine do not necessarily include a specific DeviceID since the information applies to multiple entities. Another example of a routine that adds notices to the notice database 1004 is a routine that inserts notices that communicate the availability of service advisory information from a vendor. These notices are informational and are useful to users of the network. Each notice may or may not include a DeviceID field, where the DeviceID field is included if necessary.

Figure 11:
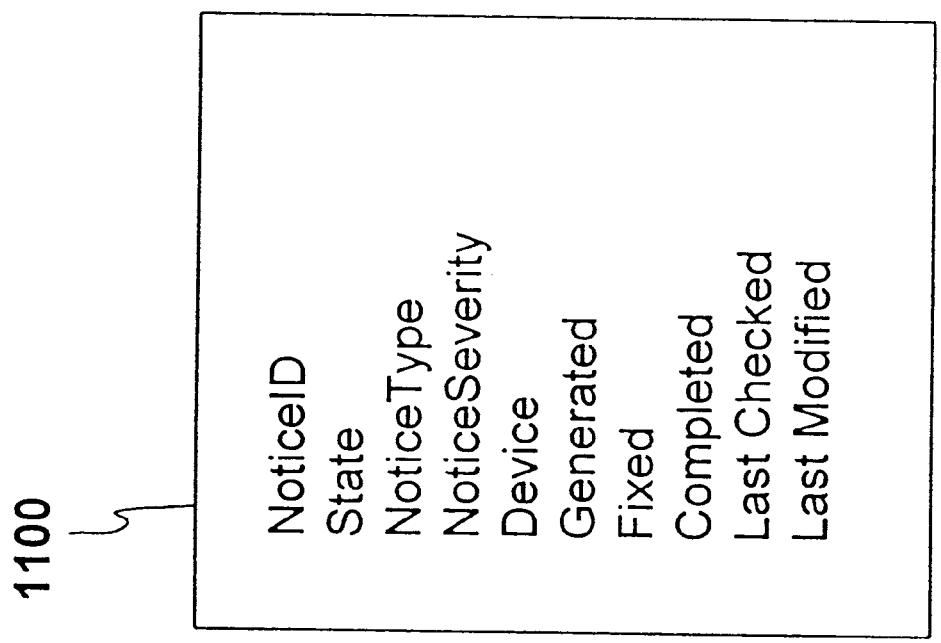
FIG. 11 is a block diagram of an exemplary notice generated and stored in the notice database of FIGS. 10 or 10A.

An exemplary notice 1100 is shown in FIG. 11, which includes several exemplary fields. An identification field "NoticeID" is a numeric key assigned to a notice when it is generated and placed in the notice database 1004. A "State" field indicates the current state of the notice as set programmatically by the code that is processing the notice. The State field may have any one of several values as follows: "Discovered" indicating the condition or event that initiated the notice has just happened and no action has been taken; "Active" indicating the notice is being processed; "Monitored" indicating a process is monitoring this notice; "Corrected" indicating the condition indicated by the notice has been corrected; and "Completed" indicating all processing on the notice has been completed. The State field is of interest to software components that are processing the notice.

The notice 1100 further includes a NoticeType field, which is a reference to information that is required for the processing of the notice. The NoticeType field may be a key to a table that contains information such as the name of the routine that will process the notice, descriptive information such as the description of an SNMP trap, etc. A "NoticeSeverity" field indicates the level of problem that the notice indicates. Allowable values for the NoticeSeverity field include informational, warning, normal, critical, minor, and major. A "DeviceId" field is an integer key into a devices table that specifies which device is being referenced by the notice, although a notice does not necessarily have to specify a device. A "Generated" field indicates the date and time that the notice was initially created. A "Fixed" field indicates the date and time that the condition represented by the notice was corrected. A "Completed" field provides the date and time that processing on the notice was completed. A "Last checked" field provides the date and time the notice was last examined and a "Last modified" field provides the date and time that the notice was last modified.

Referring back to FIG. 10, the notices within the notice database 1004 are periodically processed by means of operational groups executed by an operational group engine (OGE) 1006. Any arbitrary amount of time may be specified for executing operational groups by the OGE 1006, such as every 30 seconds, every minute, every hour, etc. The OGE 1006 generally comprises a collection of one or more predetermined constructions. One or more predetermined operational groups may be stored in an operational group memory 1008 coupled to the OGE 1006 to enable access of any one or more of the operational groups. Each operational group may be considered as "instructions" used by the OGE 1006 to generate an output result. The OGE 1006 generates one or more jobs associated with the execution of each operational group, where each job is stored in a job store memory 1010 coupled to the OGE 1006.

Figure 12:
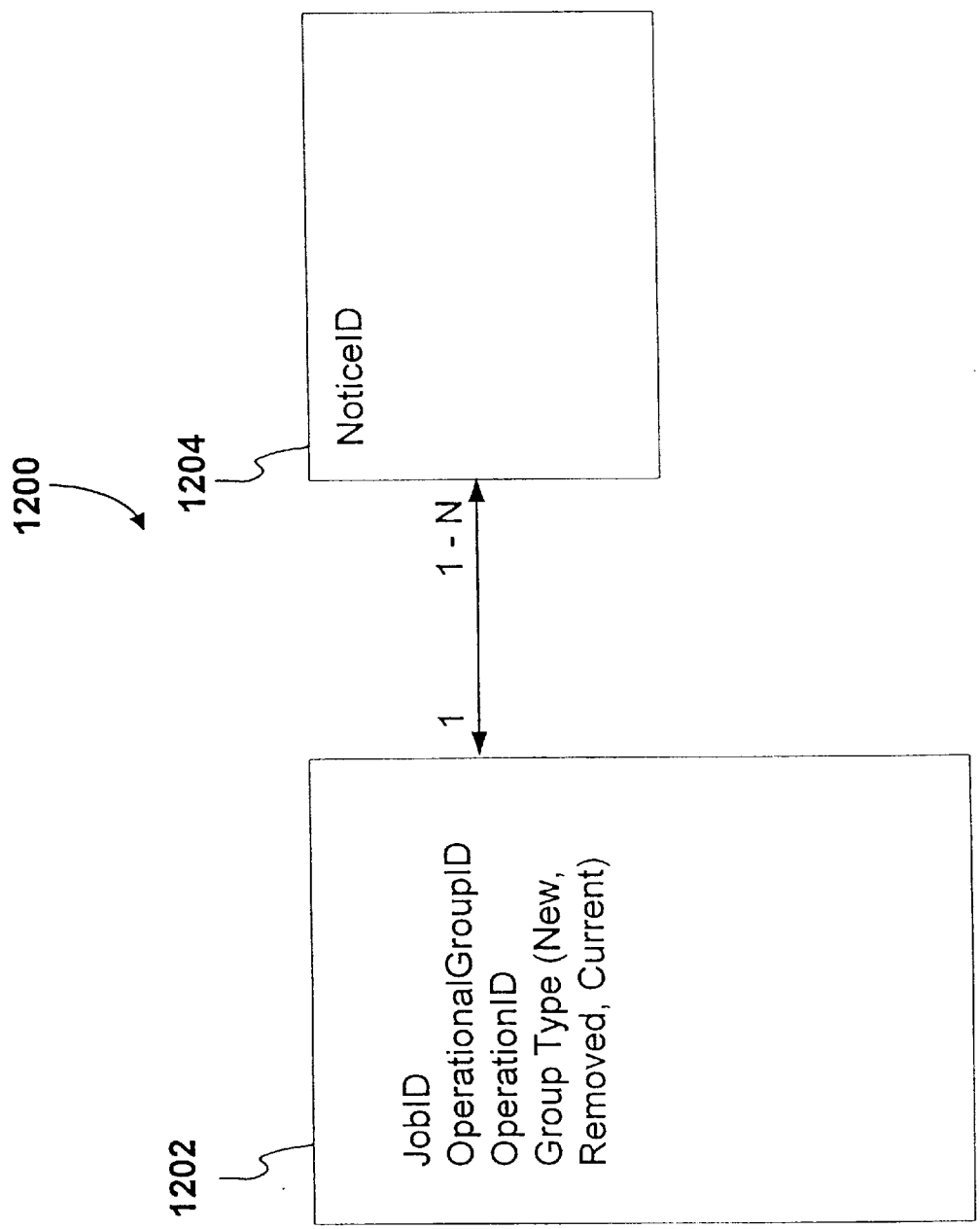
FIG. 12 is an exemplary job generated by the operational group engine and stored in a job store memory of FIGS. 10 or 10A.

Each job includes the information required to complete a processing activity, such as the operation to be performed and the target of the processing. In general, each job is a data structure, implemented as an object or the like, that includes a list of pointers or identifiers to enable access of an associated operation. An exemplary job 1200 is shown in FIG. 12. Each job 1200 is composed of a job body 1202 and one or more (1–N) associated subjobs 1204. A job is generated for each specified operation that is associated with a filter. The job body 1202 includes an identification field "JobID", which is an integer assigned by the OGE 1006 when the job is created. An "OperationalGroupID" field is an integer assigned when the operational group was created. An "OperationID" is an integer assigned when the operation was created. A "Group Type" field indicates a group of notices that are associated with the job, such as, for example, new, current or removed. "N" subjobs 1204 may be included, where each includes a "NoticeID" field that is the same as or that corresponds to the NoticeID identification field of the notice 100, which is a numeric key assigned to a notice when it is generated and placed in the notice database 1004. A separate subjob 1204 is included for each notice of the group of notices associated with the corresponding operation for which the job 1200 was generated.

Referring back to FIG. 10, one of a plurality of helper processing modules or "helpers" 1012 is invoked to deliver each job to an appropriate construction. Each of the helpers 1012 creates an event notification or message that is forwarded to the automation engine 210 to initiate execution of a construction that accesses or otherwise processes a job to perform a function or process. Each event message contains information to locate the corresponding job, including the event ID 802 and the event properties 806. The event properties 806 include references or pointers to the particular job within the job store memory 1010 to be accessed. The construction(s) that accesses or otherwise processes the job is one that previously registered as a listener for the event by using the event ID. The event message enables the construction to access the corresponding job, which in turn enables the construction to access the associated operation, if necessary, for the construction to perform its function or process. The job also includes one or more subjobs, which enables the construction to access one or more corresponding notices associated with the operation, if necessary, for the construction to perform its function or process.

An exemplary list of constructions, functions or processes followed by a brief description or the element that uses the construction is as follows: ADDeviceIdProcessor.construction device discovery; ADReceiver.construction device discovery; AppLaunch.construction launches an arbitrary application for execution; Broadcaster.construction send info to user interface on browser for display (overall network status); BuildGroupsWithOperations.construction OGE; CancelAnOperation.construction OGE; dataCollection.construction get device info using SNMP; DeviceNameGenerator.construction used by user interface on browser for listing devices; deviceStatusPolling.construction poll a device for its status; DiscoveredDevice.construction discovery function; DMIDataCollection.construction get device info using DMI; DmiRequestor.construction DMI utility; DMIStatusPolling.construction poll a DMI device; ExecuteOperationNow.construction used by user interface on browser to execute an operation immediately; ExecuteUpdateGenerator.construction used by user interface on browser to execute an update; FilterGenerator.construction used by user interface on browser operational group wizard to build operational group; FilterSaver.construction part of previous; FuncConfigGenerator.construction associate an operation with a filter user interface on browser build operational group wizard; GenerateOperations.construction operational group; getCachedItem.construction utility function; GlobalStatus.construction user interface on browser pi chart display back end; hmmoLinkProcessor.construction polls device to determine what hmmo's are installed; HttpHandler.construction discovery function; IpxSaper.construction discovery function; IpxSapHandler.construction discovery function; MonitorOperationStatus.construction determines what percent of an operation is completed for display by user interface on browser; NetworkingProductsIdentify.construction after a device is discovered, this construction performs a more detailed examination of the device to identify which specific networking is product it is; OpenOperationStatus.construction user interface on browser; OperationConfigSaver.construction user interface on browser operational group wizard; PartitionOperationAndRun.construction OGE; PerformOperations.construction OGE; Pinger.construction performs network pinging for device discovery; QueryGenerator.construction user interface on browser operational group wizard for building an operational group; RemoveDiskThreshold.construction removes disk threshold on device; SapHandler.construction discovery function; SaveJob.construction OGE; ScheduleViewDataGenerator.construction user interface on browser operational group wizard to set conditions when to run; SendEmail.construction send an email; SetDiskThreshold.construction sets disk threshold on device; SnmpRequester.construction discovery function; StartDiscovery.construction discovery function; TransactionLogCheck.construction housekeeping on database transaction log; TrapHandler.construction handles SNMP trap; TrapRequester.construction handles SNMP trap; UpdateOperationStatus.construction user interface on browser support; ViewInitialization.construction user interface on browser support for views;

ViewUpdater.construction user interface on browser support for views; and WebServerStart.construction used to start the web server process.

Figure 10A:
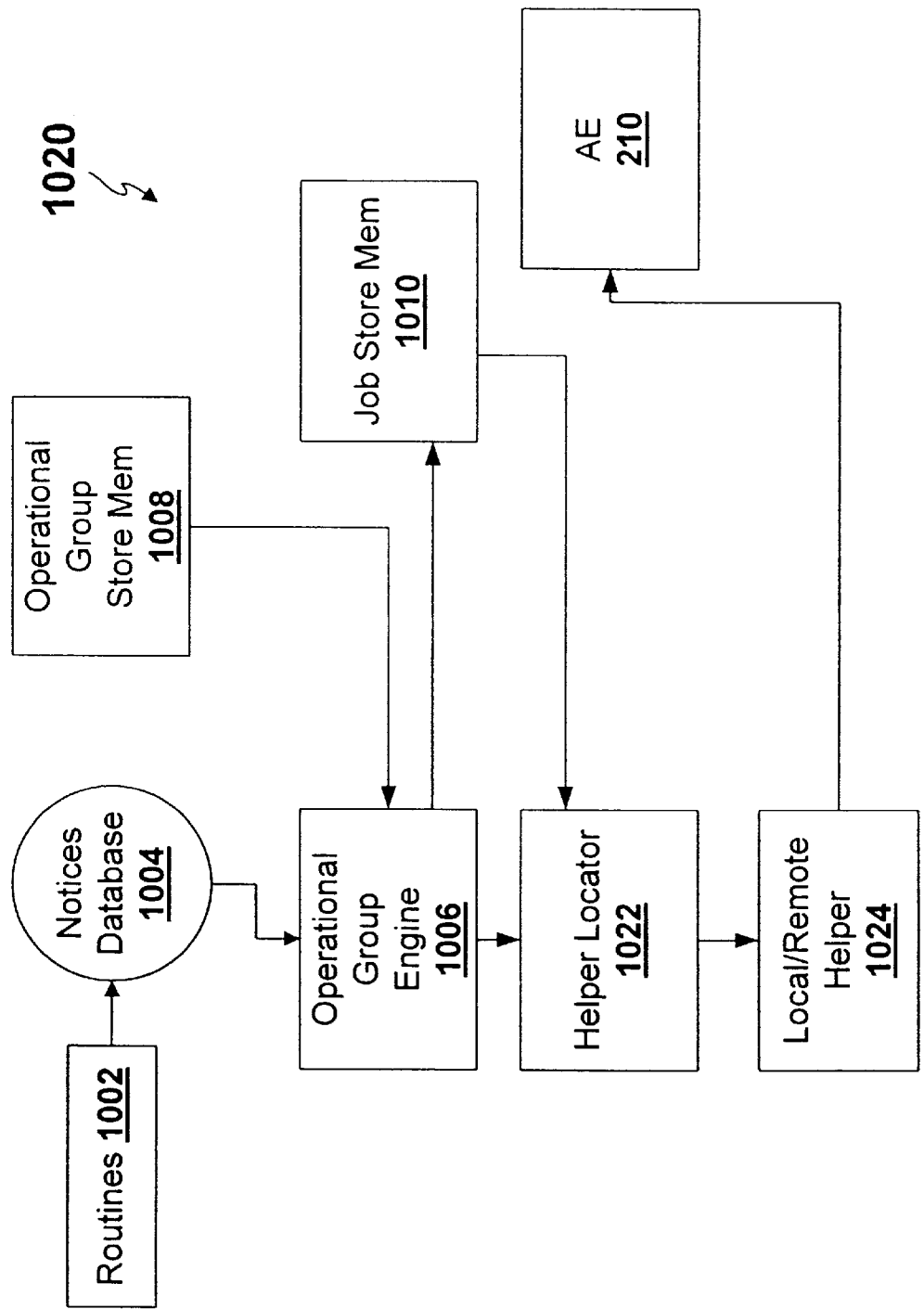
FIG. 10A is a block diagram of an alternative operational group system that uses local or remote helpers to facilitate distribution of workload across multiple management servers participating in a network.

FIG. 10A is a block diagram of an alternative operational group system 1020, which represents an extension of the operational group system 1000. In FIG. 10A, similar elements or components assume identical reference numbers. The operation group 1020 enables the existence of multiple, local and distributed and/or remote helpers 1024. In this case, additional information known as partition information is associated with each operation to be performed. The partition information specifies the location of one or more local and/or remote helpers 1024 that are invoked to process a job. Each remote helper is a subset of the functions performed by the management system operating on the management server 102. Each remote helper includes an associated automation engine required to process jobs by executing constructions, the support for processing net events, etc. As shown in FIG. 10A, a helper locator 1022 that includes the partition information is coupled to the OGE 1006 to dispatch one or more jobs to a multiplicity of local and/or remote helpers 1024 located on other computer systems that participate in a given network to be managed, such as the management network 100. In one embodiment, the location of each remote helper is specified by use of the URL format within the helper locator 1022.

Figure 10B:
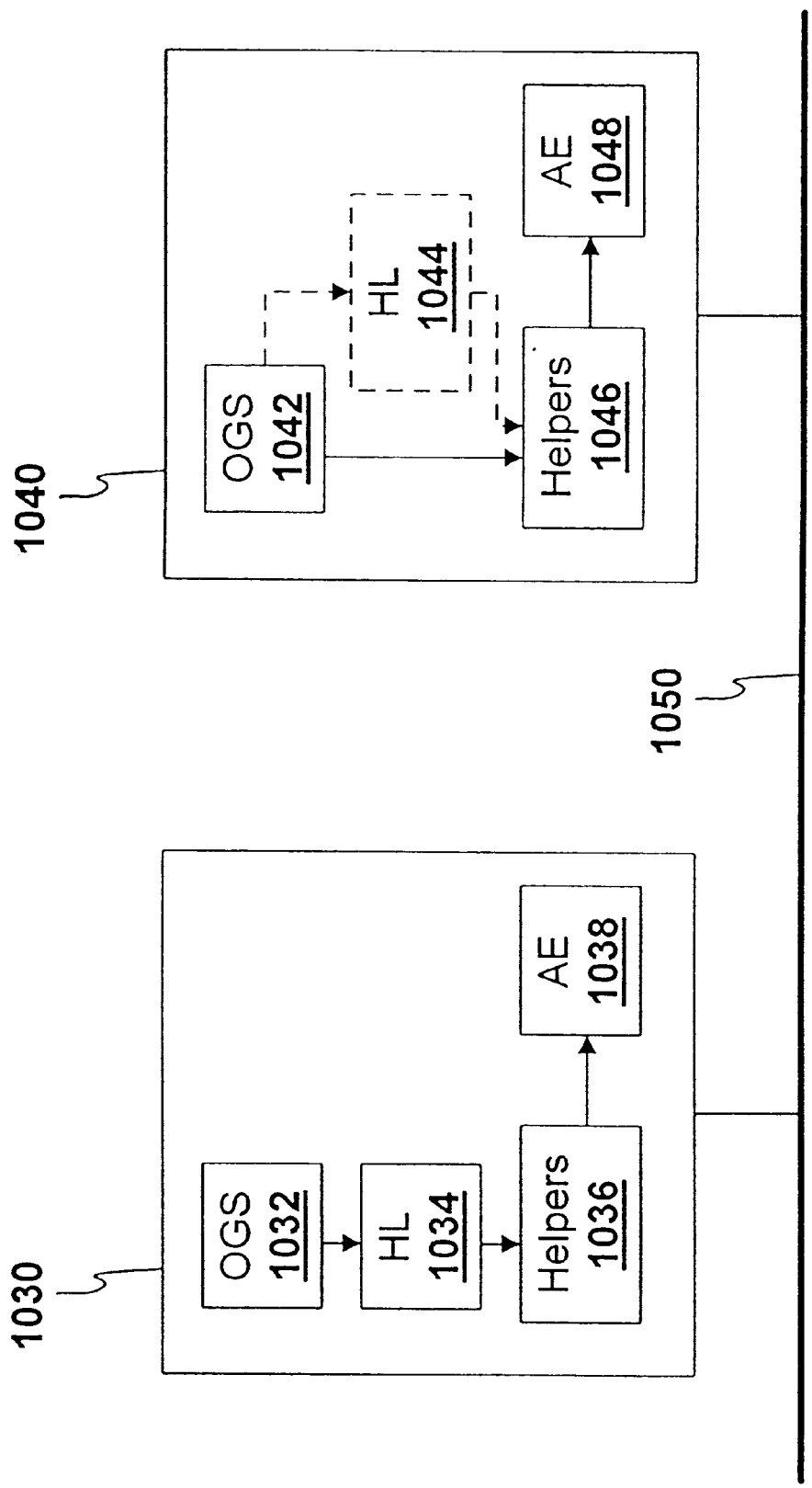
FIG. 10B is a block diagram illustrating the use of remote helpers to facilitate distribution of workload across multiple management servers participating in a network.

The use of remote helpers facilitates distribution of the workload across multiple management servers participating in a network. For example, FIG. 10B is a block diagram showing a first management server 1030 coupled to a network 1050, where the first management server 1030 includes an operational group system (OGS) 1032 including corresponding routines, a notice database, an OGE, an OG store memory, and a job store memory. The management server 1030 further includes a helper locator (HL) 1034, a set of helpers 1036 and a local automation engine (AE) 1038. Another, similar management server 1040 is coupled to the network 1050 and includes its own OGS 1042, a set of helpers 1046 and its own local AE 1048. The respective set of routines operating in the OGS 1032 and 1042 may perform similar functions but do not necessarily monitor the same parameters and variables of the network 1050.

The management server 1030 may generate one or more operations and associated jobs that it desires to offload to another management server, such as the management server 1040. The helper locator 1034 locates one or more associated helpers in the set of helpers 1046 located on the management server 1040, which generates one or more corresponding event notifications to its local AE 1048. The AE 1048 uses the event notifications to locate the one or more jobs located in the OGS 1032 on the management server 1032, and processing proceeds in a similar manner described above. Likewise, the management server 1040 may also include a helper locator 1044, which may be used in a similar manner to offload jobs from the management server 1040 to other management servers participating in the network 1050, such as the management server 1030. In this manner, the functions or operations to be performed by one or more constructions may be distributed among multiple management servers in a network system, such as the management network 100 or the network 1050.

Figure 13:
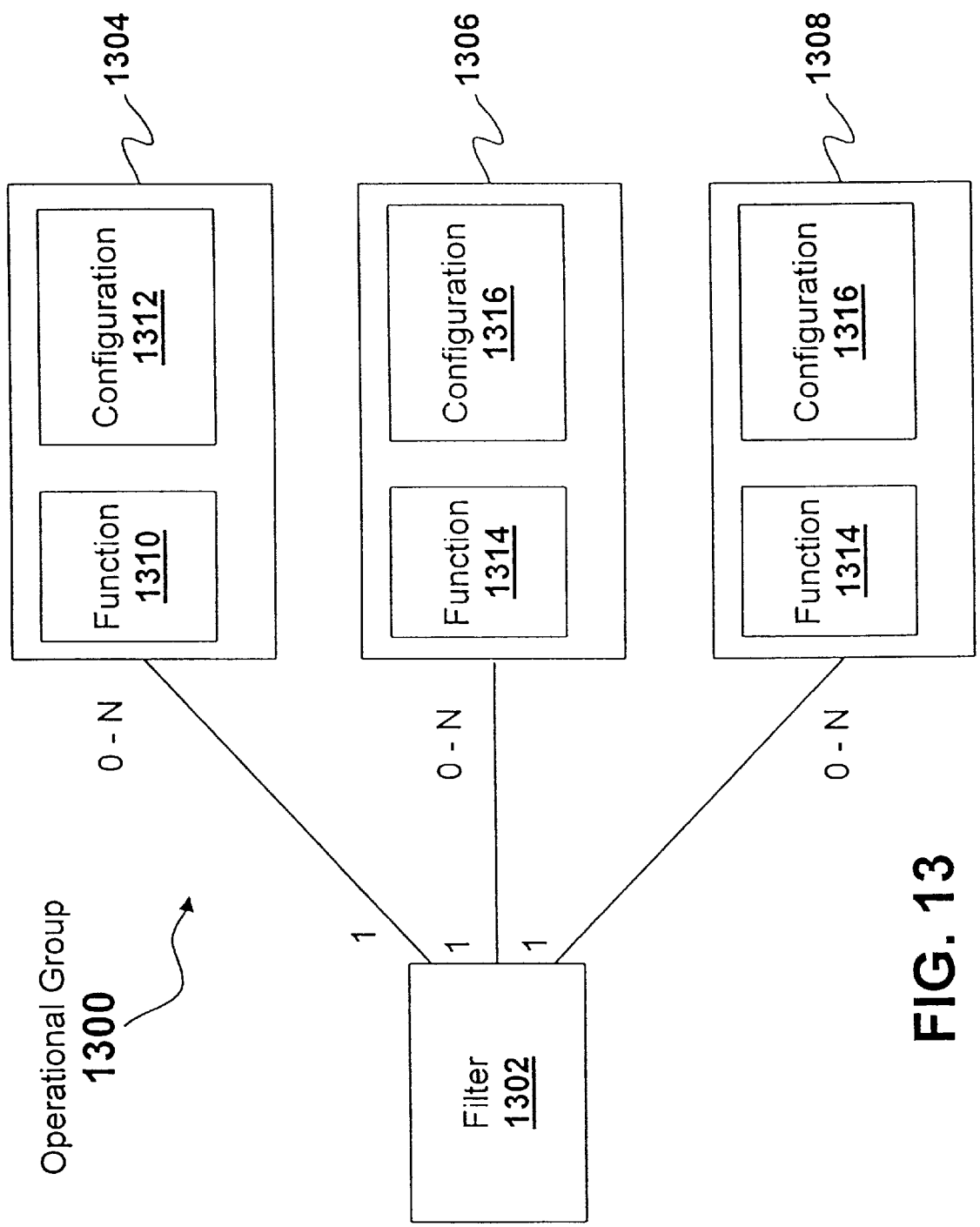
FIG. 13 is a block diagram illustrating a generalized operational group that represents any operational group executed by the OGE of FIGS. 10 or 10A.

Referring now to FIG. 13, a block diagram is shown of a generalized operational group 1300 that represents any operational group executed by the OGE 1006. In general, each operational group is used to allow for the specification of operations to be performed on selected managed devices, such as any of the managed devices 104. Examples of operations are polling the device for status, collecting SNMP management information from the device, sending an email, etc. For each operational group, a filter 1302 is used to select one or more sets of notices from the notice database 1004. In the embodiment shown, the filter 1302 is implemented as a database selection criteria, such as an SQL SELECT statement or the like, that is applied to the notice database 1004 by the OGE 1006 to produce a resultant set of table rows. When executed by the OGE 1006, the filter 1302 uses previous state information to produce three result sets, including new notices that were not in the notice database 1004 during the last time the filter 1302 was applied, a current set of notices that are selected based on the criterion of the filter 1302, and removed notices including notices that have been removed from the notice database 1004 since the last time that the filter 1302 was applied.

More particularly, the filter 1302 of the operational group 1300 is associated with three operations 1304, 1306 and 1308, where each operation includes function and configuration pairs. For example, the operation 1304 includes a function 1310 and a configuration 1312, the operation 1306 includes a function 1314 and a configuration 1316 and the operation 1308 includes a function 1318 and a configuration 1320. The operation 1304 will be executed against the result set representing new notices that were not in the notice database 1004 during the last time the filter 1302 was applied, the operation 1306 will be executed against the result set representing a current set of notices that are selected based on the criterion of the filter 1302 and that are the same since the last time that the filter 1302 was applied, and the operation 1308 will be executed against the result set representing removed notices or notices that were removed from the notice database 1004 since the last time that the filter 1302 was applied. An example of a function is a construction, such as the construction 400, that is implemented to send an email. Each of the configurations 1312, 1316 and 1320 includes data and configuration information that may be necessary to execute the respective functions 1310, 1314 and 1318. An example of configuration information for an email function is the addressee of the email, when and how often to send the email, etc.

The notation "0–N" indicates that a single filter, such as the filter 1302, may be associated with 0 to N instances of each of its associated operations, such as any one or more of the operations 1304, 1306 and 1308. For example, if a filter is implemented to select notices for newly discovered devices in the management system 100, it might only be associated with a single instance of an operation, such as an operation corresponding to the operation 1304 representing a new result set, to send an email when a new device is discovered in the management system 100. Alternatively, a filter could also be associated with an operation corresponding to the operation 1306 to represent current devices and/or another operation corresponding to the operation 1308 representing devices removed from the management system 100 since the last time the filter was applied.

When the OGE 1006 executes the operational group 1300 to apply the filter 1302, the OGE 1006 produces three result sets. After the OGE 1006 obtains the result sets, it associates each operation 1304, 1306 and 1308 with its respective result set. These associated data structures are processed to form a corresponding job, as illustrated by the job 1200. A separate job is generated for each specified operation. For example, a separate job is generated for each of the operations 1304, 1306 and 1308 associated with the filter 1302. The jobs produced by OGE 1006 are then stored in the job store memory 1010. Since the job includes an operational group identifier (OperationalGroupId), an operational identifier (OperationId) and a group type (Group type), the job enables access to the associated operation and operational group. Also, since the job includes one or more subjobs, each including a reference to an associated notice (NoticeID), the job further enables access to one or more associated notices within the notice database 1004 associated with the operation and/or operational group.

FIGS. 14A–I are screen shots of an exemplary browser, such as the Microsoft Internet Explorer by Microsoft Corporation or Netscape by Netscape Communications Corp., illustrating an interactive procedure for generating an operational group according to the present invention. Each screen shot is displayed on a display device, such as a computer monitor or the like. A user manipulates one or more input devices, such as a keyboard and a mouse, to make selections and provide input to generate the operational group. In this particular example, it is desired to send an email to a system administrator in response to detection of one or more new devices on a network system, such as the management system 100.

Figure 14A:
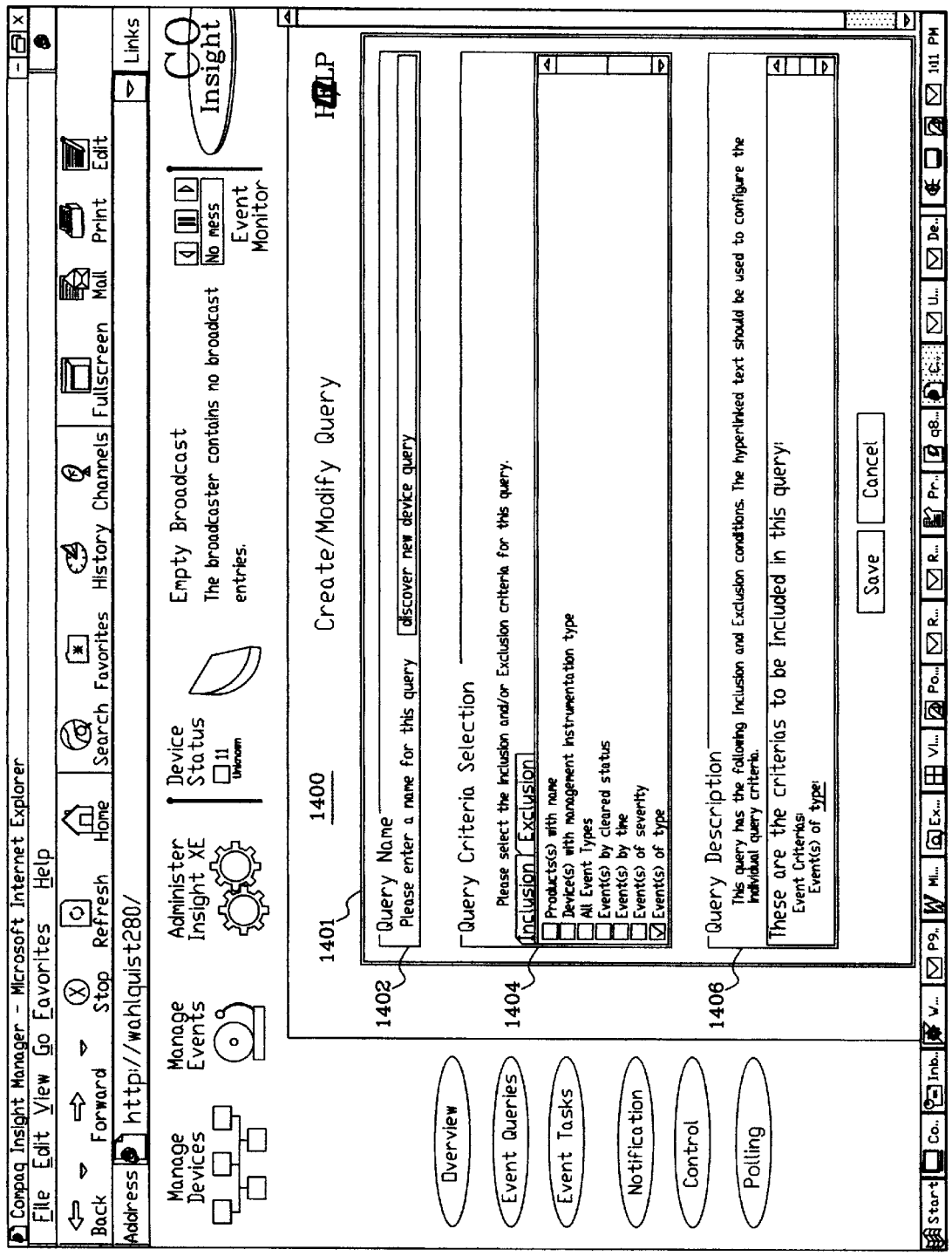
FIGS. 14A–I are screen shots of an exemplary browser illustrating an interactive procedure for generating an operational group according to the present invention.

In FIG. 14A, a Create/Modify Query menu 1400 is initially displayed with a Query window 1401, where a query denotes the criteria to be used by a filter to select the appropriate notices. It is noted that the processes 1002 include one or more new device processes that are continuously or periodically executed to detect new devices on the network, where the new device processes generate corresponding notices stored in the notice database 1004 indicating the new devices. The terms "Event" or "Events" used in each of the screen shots, including the Create/Modify Query menu 1400, refers to logical events or more complex events than described in relation to the automation engine 210, and may generally be referred to as "notices". The Query window 1401 includes a "Query Name" section 1402, a "Query Criteria Selection" section 1404 and a "Query Description" section 1406. As shown, the user types "discover new device query" in the Query Name section 1402 and selects an "Event(s) of type" criteria in the Query Criteria Selection section 1404. The user then selects a hyperlink "type" in the Query Description section 1406.

Figure 14B:
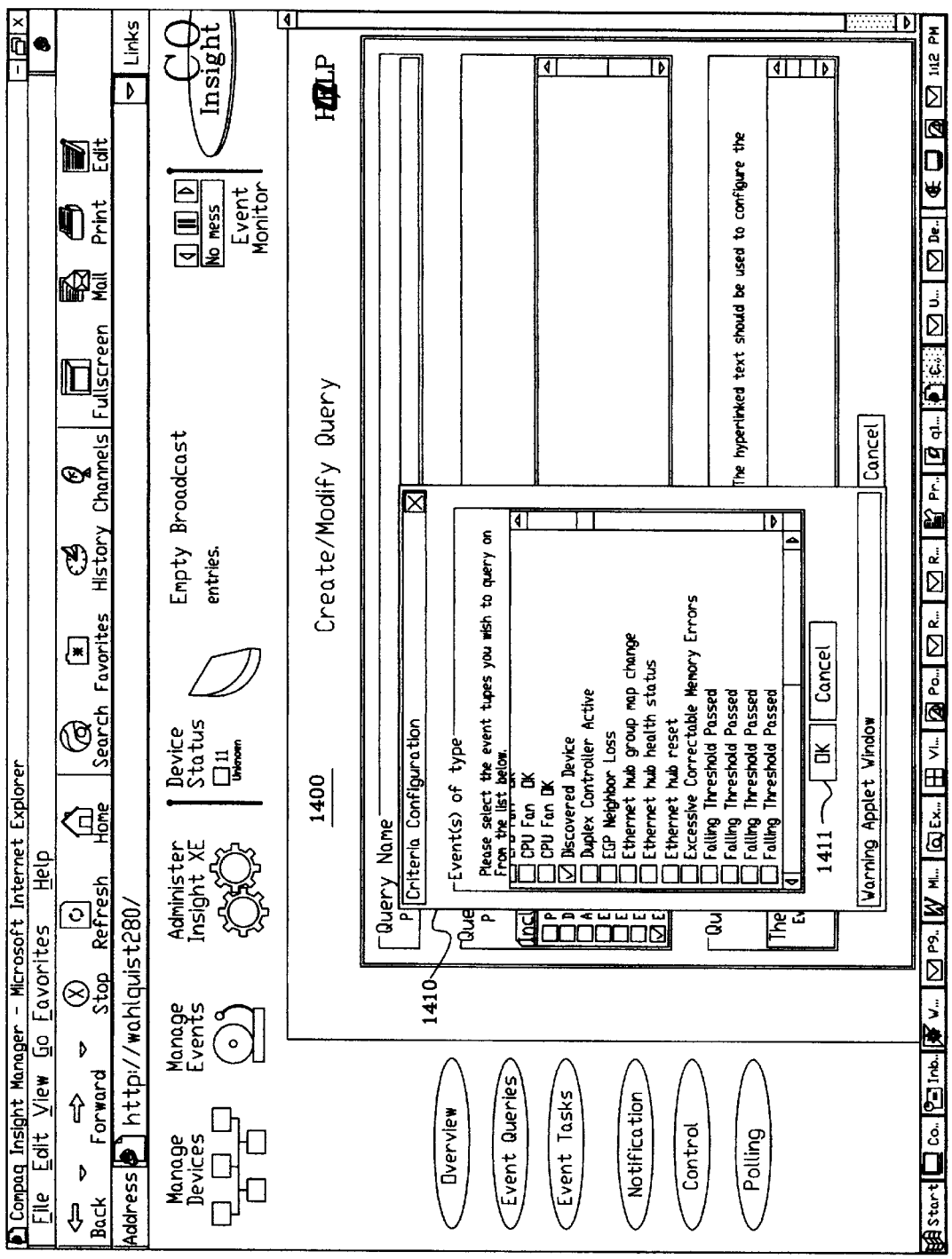

FIG. 14B shows the result of the selection of the "type" hyperlink, where the browser displays a "Criteria Configuration" window 1410. The Criteria Configuration window 1410 includes a plurality of notices that are generated by the new device processes of the processes 1002 that run to conduct discovery of devices that are participating in the network. These processes 1002 may be implemented as Java objects or the like that are executed as constructions to carry out device discovery. As shown, the user has selected a "Discovered Device" notice query in the Criteria Configuration window 1410, and then selects an "OK" button 1411 to complete the query selection.

Figure 14C:
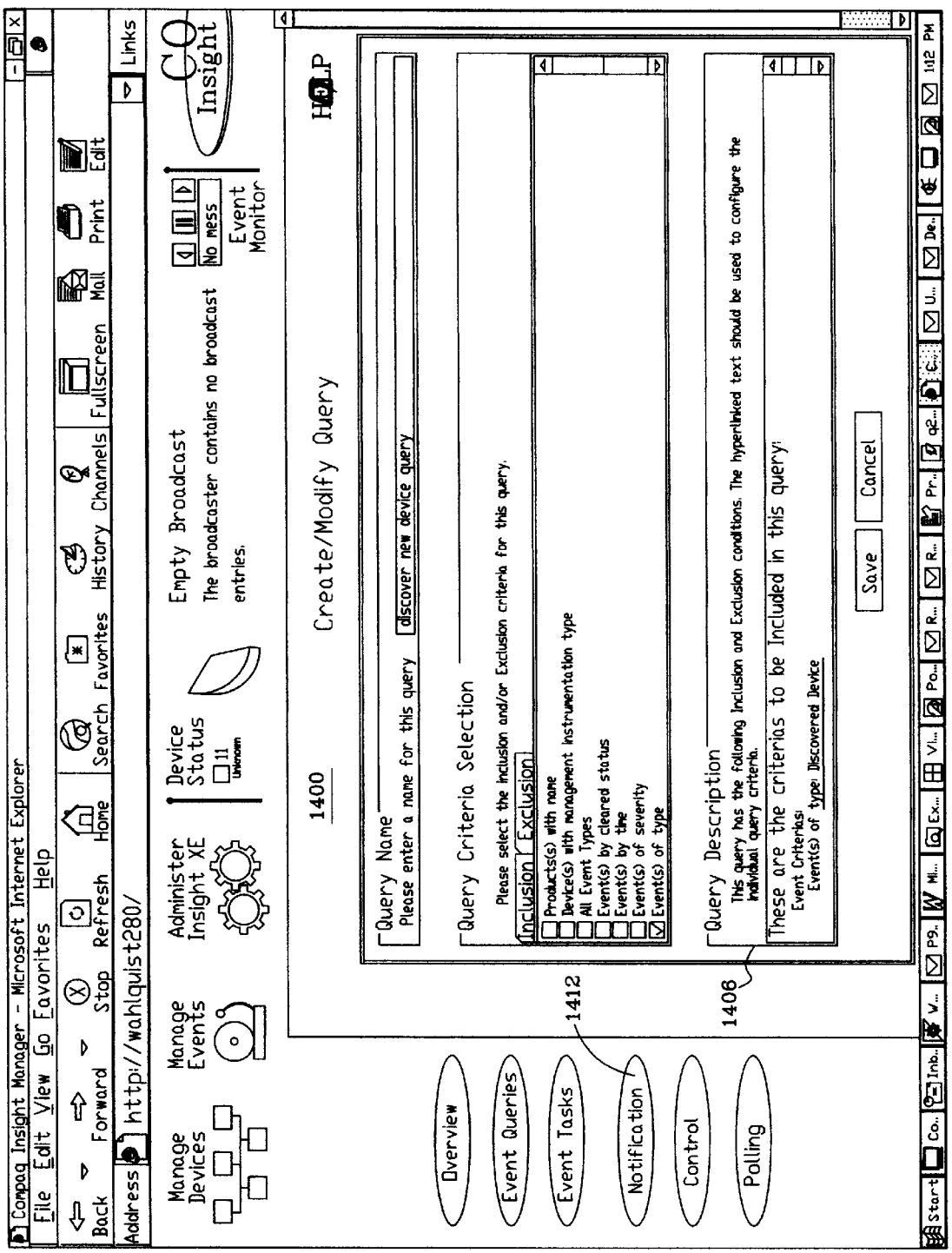

FIG. 14C is another screen shot of the Create/Modify Query menu 1400 illustrating completion of the event query. In particular, the "Event(s) of type" of the Query Description section 1406 is modified or updated to indicate a "Discovered Device" selection as the notice type. As shown in FIGS. 14A–C, a menu is shown on the left-hand side of the Create/Modify Query menu 1400 including a "Notification" button 1412.

Figure 14D:
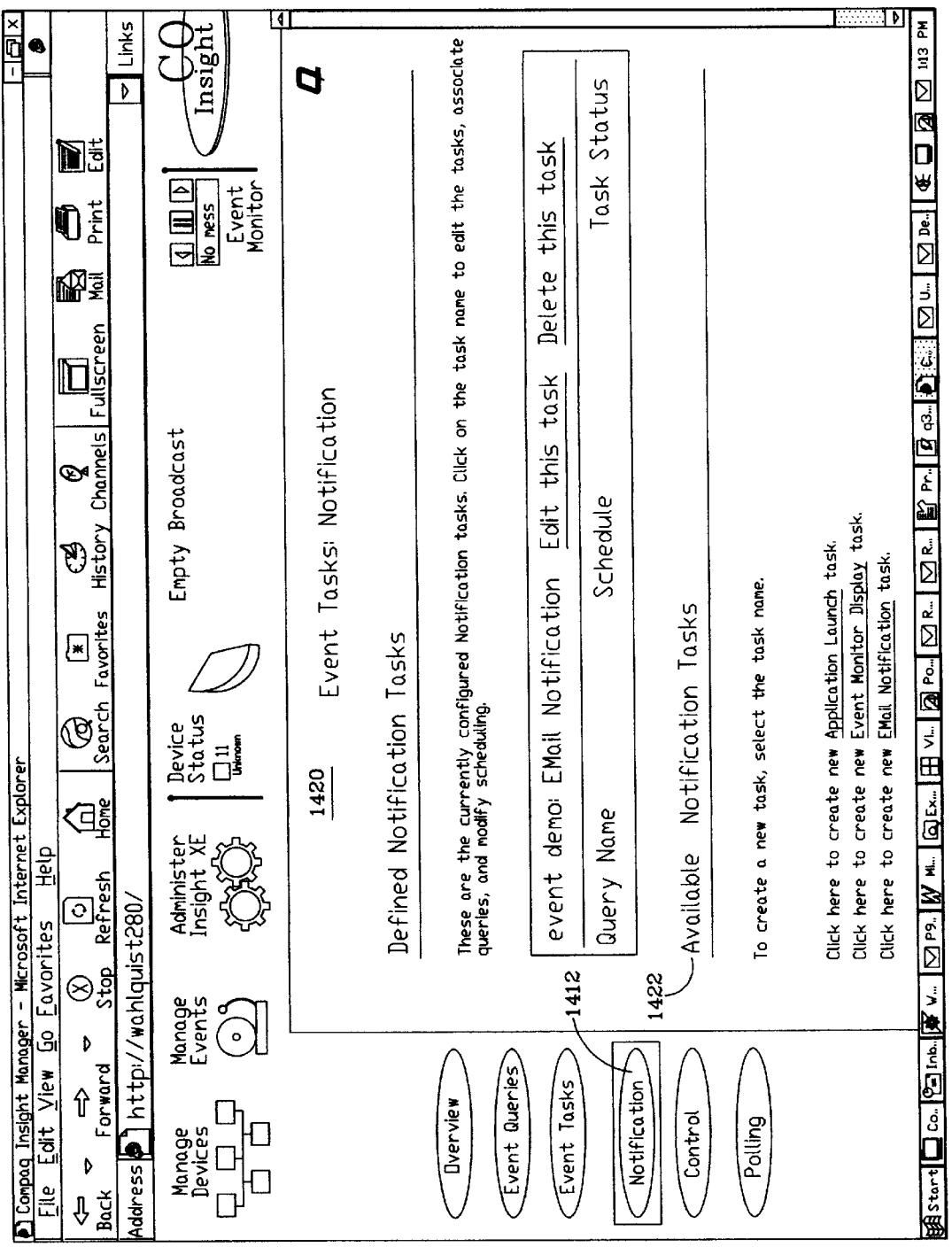
Figure 14E:
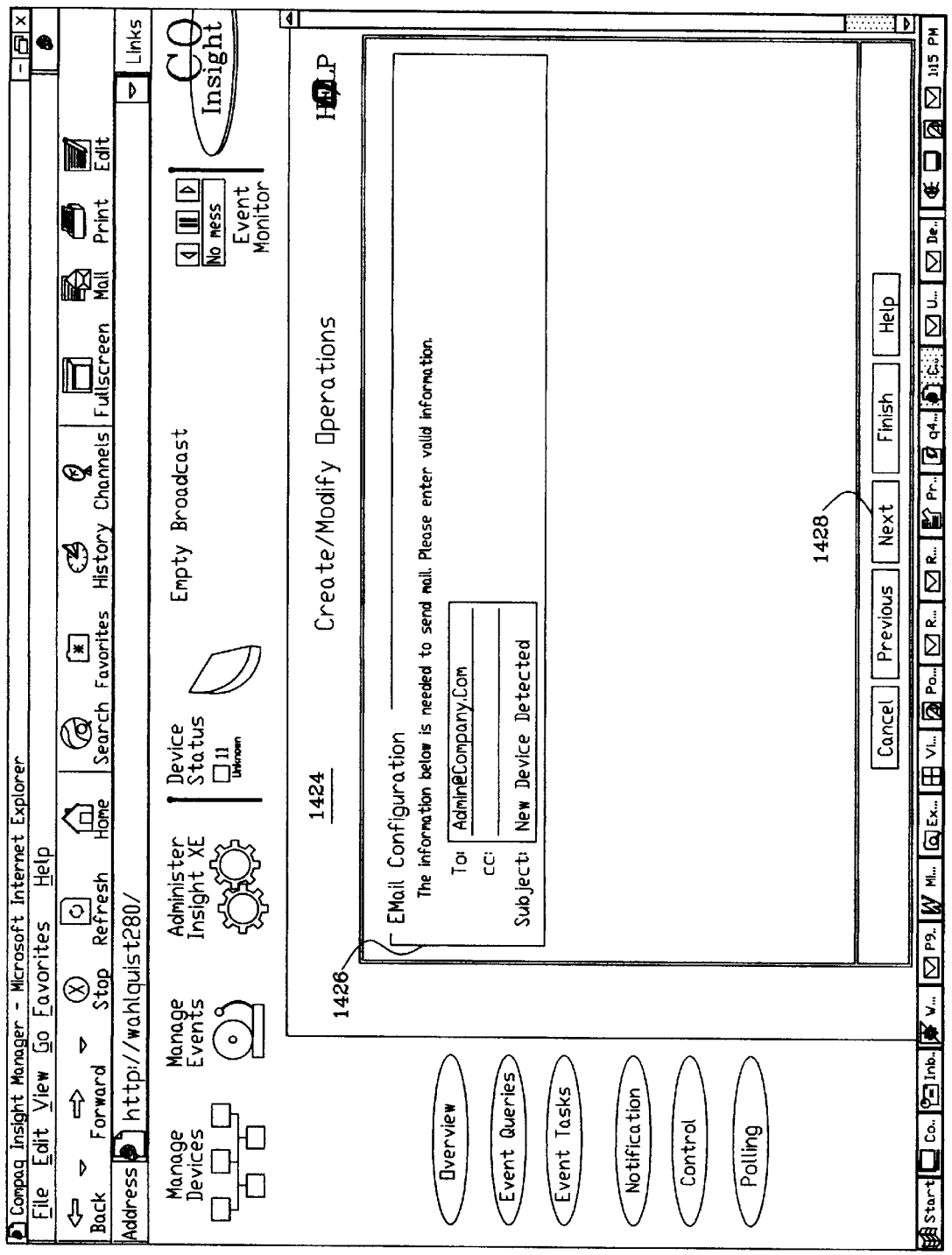

FIG. 14D is a partial screen shot illustrating selection of the Notification button 1412 shown in FIG. 14C. In this example, the Create/Modify Query menu 1400 is replaced with a Notification menu 1420. The Notification menu 1420 displays the status of operational groups that have been previously defined, and permits the user to create new operational groups. In the screen shot of FIG. 14D, no operational groups have yet been defined. An "Available Notification Tasks" section 1422 of the Notification menu 1420 includes several selectable hyperlinks including an "Email Notification task" hyperlink that is selected by the user. FIG. 14E shows a Create/Modify Operation menu 1424 with an Email window 1425 that is displayed as a result of the selection of the Email Notification task hyperlink shown in FIG. 14D. The Email window 1425 further includes an "Email Configuration" section 1426, which enables the user to enter email information, including, for example, addressee (to) and carbon copy (cc) email addresses and a subject. In this case, an email address "admin@company.com" is entered to indicate the system administrator of a company, and a subject "New Device Detected" is typed in to specify the subject of the notification.

Figure 14F:
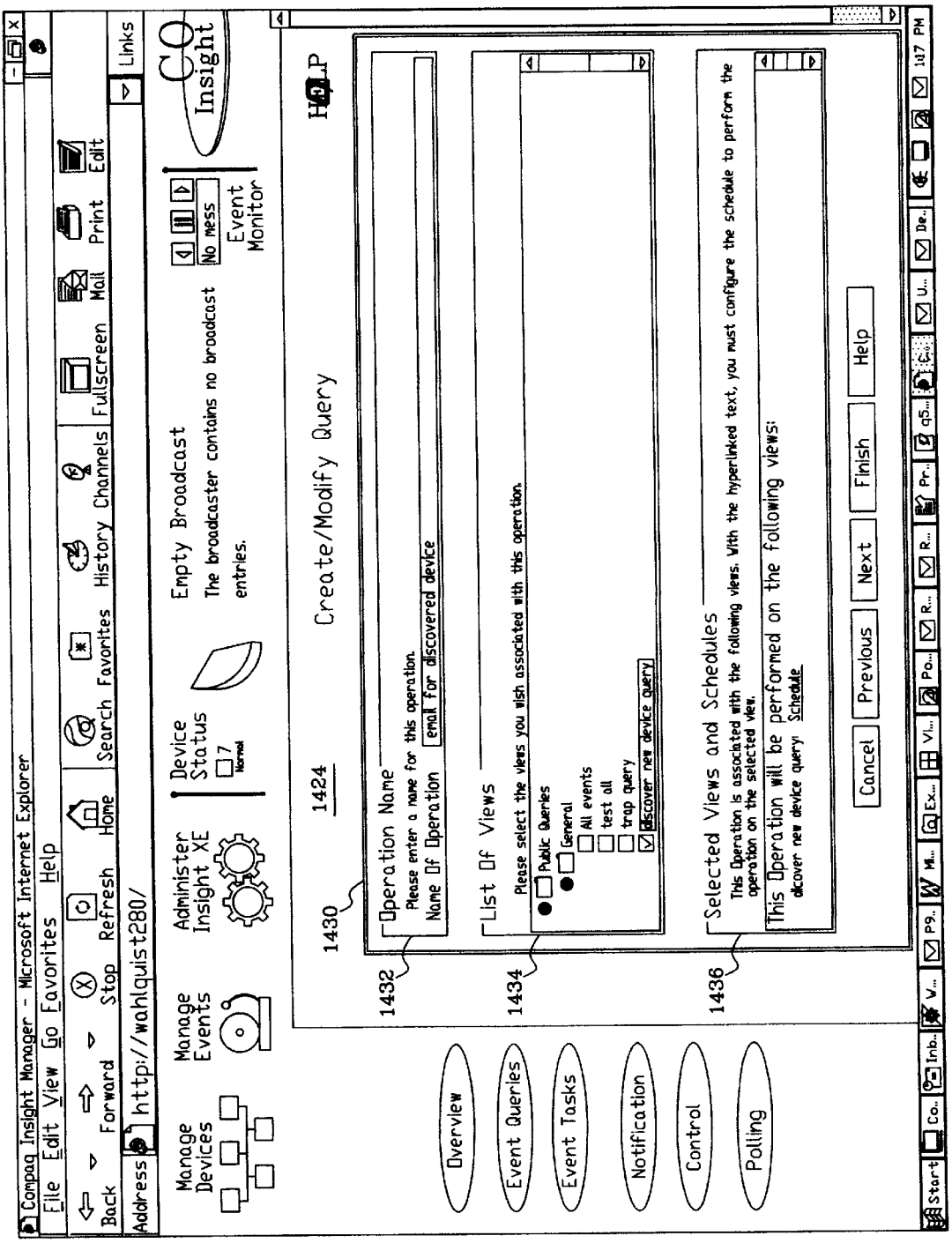
Figure 14G:
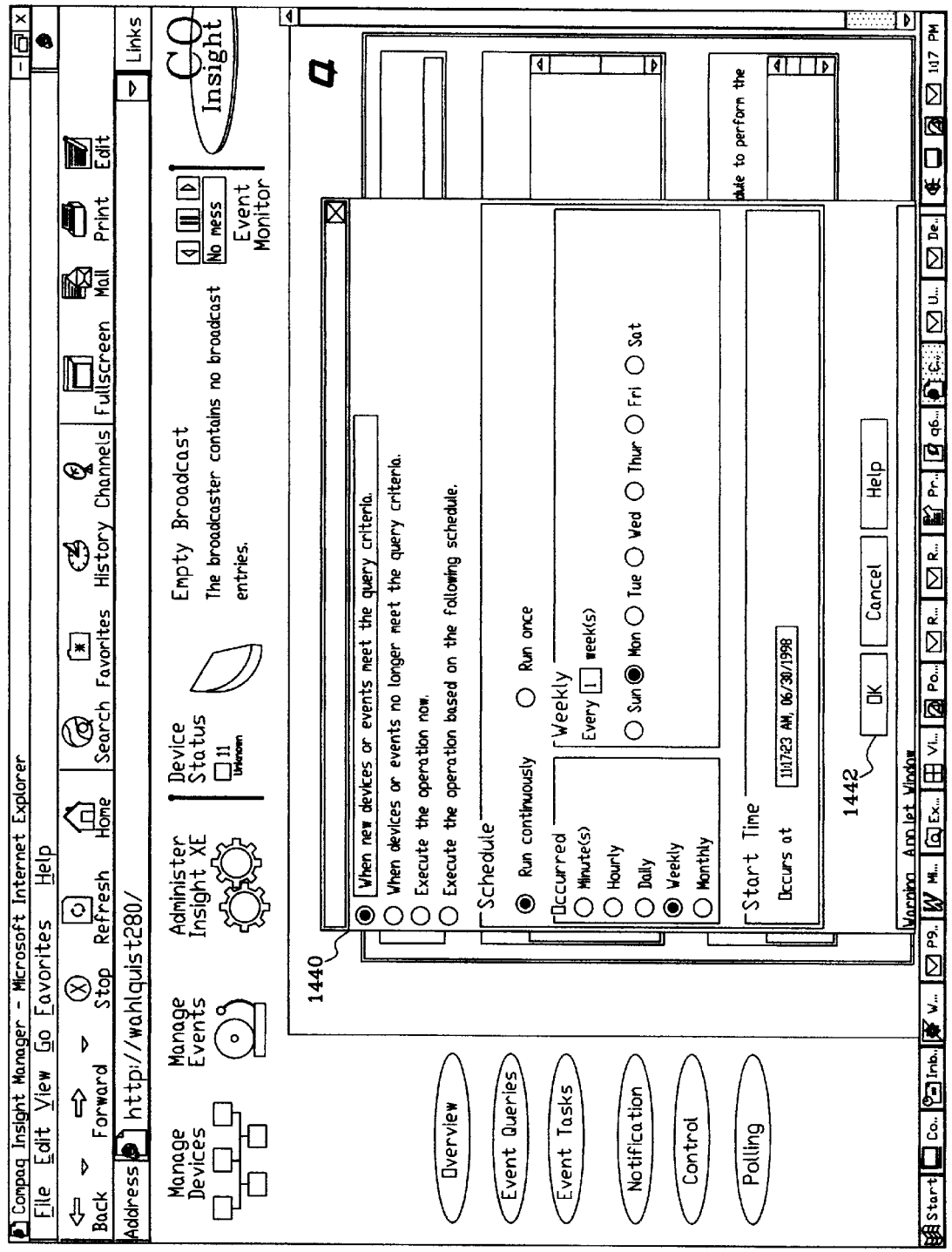

A "Next" button 1428 of the Email window 1425 is then selected resulting in an Operation window 1430 to be displayed, as shown in FIG. 14F. The Operation window 1430 includes an "Operation Name" section 1432, a "List of Views" section 1434 and a "Selected Views and Schedules" section 1436. The List of Views section 1434 lists a plurality of filters for selection by the user. In this example, the user selects a "discover new device query" filter, which associates the filter with the "email for discovered device" operation. The Selected Views and Schedules section 1436 includes a hyperlink "Schedule", which, when selected by the user, causes a Schedule window 1440 to be displayed as shown in FIG. 14G. The Schedule window 1440 shown enables the user to define how often or under what conditions that the operation is to be performed. For example, the user may select that the operation be performed every number of minutes, hours, days, weeks, months, or any other timed periodic execution. The user may also select certain days and start times. Alternatively, the user may choose to have the operation performed immediately, when the query criteria is met, or when the query criteria is not met. Of course, any type of schedule may be defined and specified depending upon the particular configuration and the operation to be performed. In the example shown, the user has selected that the operation be performed when new devices or events meet the query criteria.

Figure 14H:
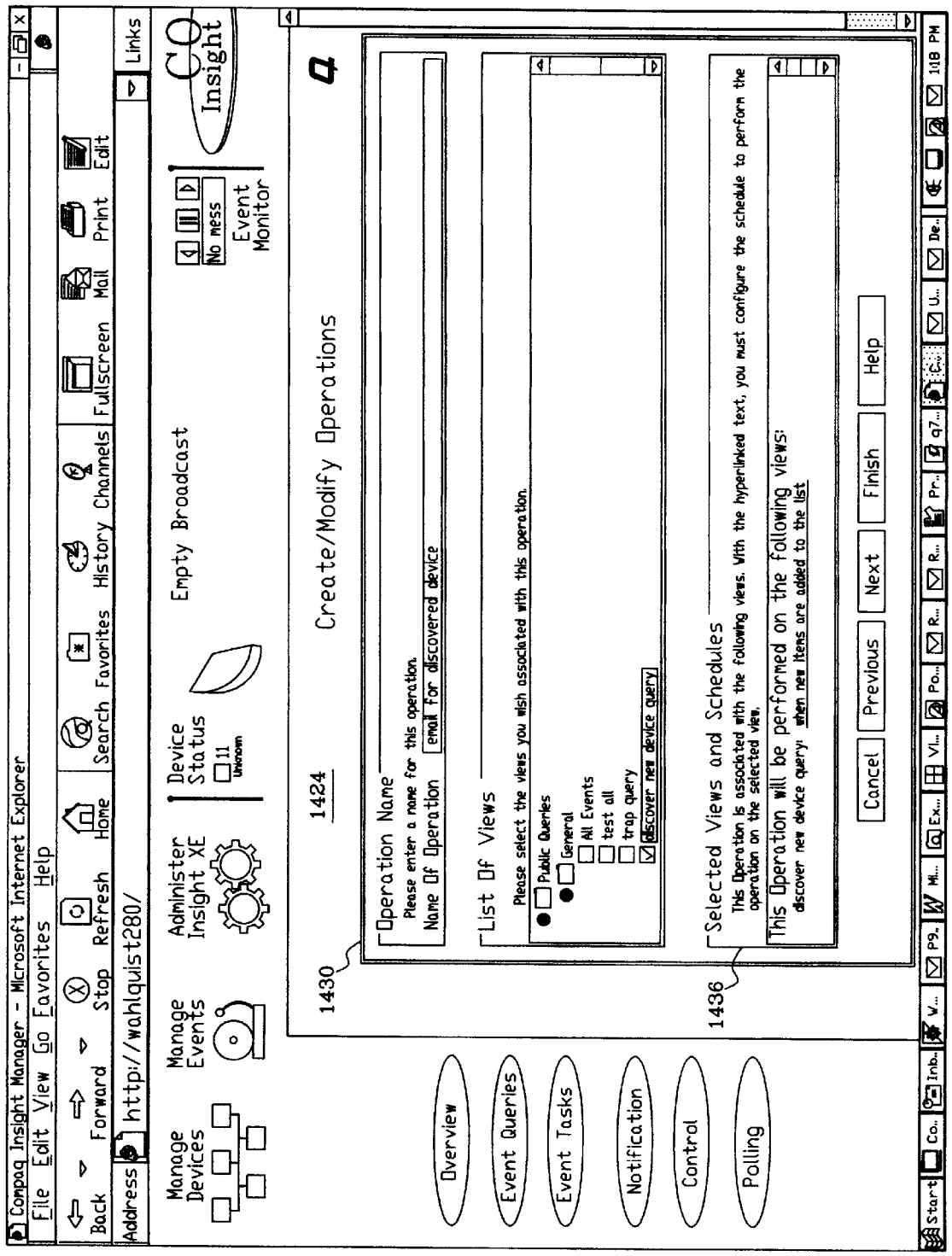
Figure 14I:
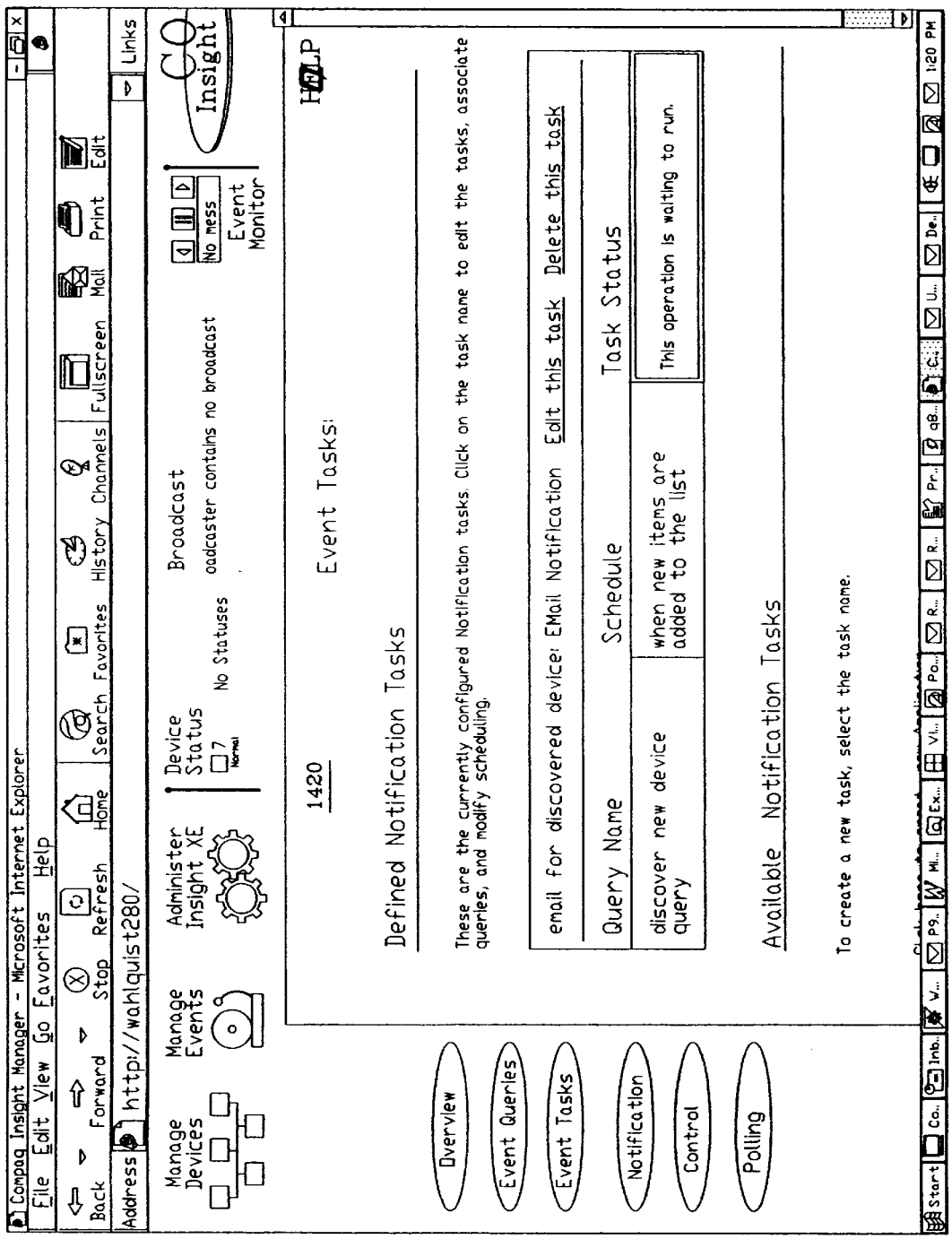

Upon selection of an "OK" button 1442 in the Schedule window 1440, the display returns to the Operation window 1430 as shown in FIG. 14H, where the Schedule hyperlink in the Selected Views and Schedules section 1436 is replaced with a schedule criteria "when new items are added to the list". FIG. 14H illustrates the completed operational group. FIG. 14I shows an updated Notification window 1420, which has been modified in response to the creation of the Email Notification operational group by the user. The processes 1002 detect any new devices in the network and generate corresponding notices for entry into the notice database 1004. Periodically, such as every 30 seconds or so, the OGE 1006 executes one or more operational groups, including the newly created Email Notification operational group, and corresponding jobs are created and stored in the job store memory 1010. A helper from the plurality of helpers 1012, or from the local and/or remote helpers 1024 as found by the helper locator 1022, is invoked by a construction in the OGE 1006 to send an event message or notification to the automation engine 210. For new devices, an event message is sent with an appropriate EventID that is listened for by an email construction, which uses the corresponding event properties to locate the corresponding job in the job store memory 1010 associated with new devices. The construction uses the job to locate the corresponding operation and/or operational group and associated values or parameters contained therein. For example, the construction access a configuration corresponding to the configuration 1312 of an operation corresponding to the operation 1304 to access the email address and subject. The construction uses the configuration information to perform its function, which, for this example, to send an email to the address "admin@company.com" to notify the system administrator of the company with the subject "New Device Detected". In this manner, the system administrator is informed that a new device has been detected in the network system.

Several constructions are utilized in the management server. In the case of discovering IP-based devices, one of the executable components is IpDiscoveryHandler.java. The source to this file is included below in Appendix B. The IpDiscoveryHandler.java module includes code that is used to create a discovered device notice in the notices database. This The IpDiscoveryHandler.java module is run as a result of previous modules being executed that discovered the existence of an IP-address on the network.

Appendix B also includes another Java module referred to as NoticeApiImpl.java. The NoticeApiImpl.java module includes code to add a notice to the notice database. This code is used by programs to add notices to the notice database such that they can be selected by filters in operational groups.

Appendix B includes another Java module referred to as NoticeObject.Java. Instances of this object are used to represent notices when they are created and manipulated by executable components. The NoticeObject.Java module includes code that is used to load an instance of a NoticeObject object with the contents of a row of the notice database table. To lower execution time, a cache of unused instances of this object is maintained such that when a new instance is needed, an unused instance can be obtained from the cache rather than going through the process of instantiating a new instance of the Java object.

The above-listed sections and included information are not exhaustive and are only exemplary for computer systems. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A programmable operational system for managing devices participating in a network, comprising:
    a collection of notices indicative of at least one of a network event, the status of the network and the status of at least one of the devices participating in the network;
    operation logic that filters the collection of notices based on at least one criteria and that generates at least one operation indicative of a state change of the network;
    an automation engine, communicatively coupled to the operation logic, that uses the at least one operation to perform at least one process in response to the at least one operation;
    the operation logic further generating at least one job that references the at least one operation that invokes a helper process to facilitate execution of the at least one operation;
    the helper process generating an event notification and providing the event notification to the automation engine; and
    the event notification including at least one reference to the at least one job to enable the automation engine to access the at least one operation.

2. The programmable operational system of claim 1, further comprising:
    a plurality of routines, each that periodically generates at least one corresponding notice of the plurality of notices and that stores the at least one corresponding notice into the collection of notices.

3. The programmable operational system of claim 1, the operation logic further comprising:
    an operation engine; and
    at least one operational group, each operational group for being processed by the operation engine.

4. The programmable operational system of claim 3, the operational group further including a filter and configuration information associated with the at least one operation.

5. The programmable operational system of claim 4, the at least one operation further comprising:
    at least one first operation associated with new notices in the collection of notices;
    at least one second operation associated with current notices in the collection of notices; and
    at least one third operation associated with notices removed from the collection of notices.

6. The programmable operational system of claim 1, the automation engine further comprising:
    event detection logic;
    a plurality of predetermined constructions, each that registers with the event detection logic to listen to at least one event notification, and, when invoked, that uses at least one operation to perform the at least one process associated with the at least one operation; and
    the event logic, upon detecting an event notification, invokes each of the plurality of predetermined constructions that has registered to listen to the detected event notification.

7. The programmable operational system of claim 6, further comprising:
    the at least one job further including at least one reference to at least one notice associated with the operation to enable the automation engine to access the at least one notice.

8. A network system, comprising:
    at least one managed device participating in a network; and
    a first management server participating in the network, comprising:
        a collection of notices indicative of at least one of a network event, the status of the network and the status of at least one of the devices participating in the network;
        operation logic that filters the collection of notices based on at least one criteria and that generates at least one operation indicative of a state change of the network including the at least one managed device; and
        an automation engine, communicatively coupled to the operation logic, that uses the at least one operation to perform at least one process in response to the at least one operation, the automation engine further comprising:
            event detection logic;
            a plurality of predetermined constructions, each that registers with the event detection logic to listen to at least one event notification, and, when invoked, that uses at least one operation to perform the at least one process associated with the at least one operation; and the event logic, upon detecting an event notification, invokes each of the plurality of predetermined constructions that has registered to listen to the detected event notification.

9. The network system of claim 8, further comprising:

a plurality of routines, each that periodically generates at least one corresponding notice of the plurality of notices and that stores the at least one corresponding notice into the collection of notices.

10. The network system of claim 8, the operation logic further comprising:

an operation engine; and at least one operational group, each operational group for being processed by the operation engine.

11. The network system of claim 8, further comprising:

the operation logic further generating at least one job that references the at least one operation that invokes a helper process to facilitate execution of the at least one operation;

the helper process generating an event notification and providing the event notification to the automation engine; and the event notification including at least one reference to the at least one job to enable the automation engine to access the at least one operation.

12. The network system of claim 11, further comprising:

a second management server including a collection of notices, operation logic, a helper process and an automation engine configured in a similar manner as the first management server;

the first management server further including a helper locator;

the operation logic of the first management server invoking the helper locator to locate the helper process of the second management server to facilitate execution of the at least one operation;

the helper process of the second management server generating an event notification and providing the event notification to the automation engine of the second management server; and the event notification including at least one reference to the at least one job located on the first management server to enable the automation engine of the second management server to locate and access the at least one operation of the first management server via the network.

13. The network system of claim 8, further comprising:

the at least one job further including at least reference to at least one notice associated with the operation to enable the automation engine to access the at least one notice.

14. A method of managing a network, comprising:

periodically generating a plurality of notices indicative of at least one of a network event, the status of the network and the status of at least one of the devices participating in the network;

storing the plurality of notices into a collection of notices;

executing an operation filter on the collection of notices based on at least one criteria to create at least one operation indicative of at least one state change of the network;

sending an event notification referencing the at least one operation to an automation engine;

performing, by the automation engine, a process based on at least one operation;

locating a remote helper process on the network and providing the located helper process a reference to the at least one operation;

sending, by the remote helper process, the event notification referencing the at least one operation to its local automation engine; and locating and performing, by the local automation engine, a process based on at least one operation.

15. The method of claim 14, further comprising:

generating and storing at least one job referencing the at least one operation;

providing a reference to the job in the event notification; and locating, by the automation engine, the job using the reference in the event notification.

16. The method of claim 14, further comprising:

creating a plurality of operations indicative of state changes of the network, including at least one first operation indicative of new notices in the collection of notices and at least one second operation indicative of notices removed from the collection of notices.

17. A programmable operational system for managing devices participating in a network, comprising:

a collection of notices indicative of at least one of a network event, the status of the network and the status of at least one of the devices participating in the network;

operation logic that filters the collection of notices based on at least one criteria and that generates at least one operation indicative of a state change of the network;

an automation engine, communicatively coupled to the operation logic, that uses the at least one operation to perform at least one management process in response to the at least one operation;

the operation logic further generating at least one process that references the at least one operation that invokes a second process to facilitate execution of the at least one operation;

the second process generating an event notification and providing the event notification to the automation engine; and the event notification including at least one reference to the at least one process to enable the automation engine to access the at least one operation.

18. The programmable operational system of claim 17, further comprising:

a plurality of routines, each that periodically generates at least one corresponding notice of the plurality of notices and that stores the at least one corresponding notice into the collection of notices.

19. The programmable operational system of claim 17, the operation logic further comprising:

an operation engine; and at least one operational group, each operational group for being processed by the operation engine.

20. The programmable operational system of claim 19, the operational group further including a filter and configuration information associated with the at least one operation.

21. The programmable operational system of claim 20, the at least one operation further comprising:

at least one first operation associated with new notices in the collection of notices;

at least one second operation associated with current notices in the collection of notices; and at least one third operation associated with notices removed from the collection of notices.

* * * * *